United States Patent
Degioanni

(10) Patent No.: US 10,181,981 B2
(45) Date of Patent: *Jan. 15, 2019

(54) PERFORMANCE AND SECURITY MANAGEMENT OF APPLICATIONS DEPLOYED IN HOSTED COMPUTING ENVIRONMENTS

(71) Applicant: Draios, Inc., Davis, CA (US)

(72) Inventor: Loris Degioanni, Davis, CA (US)

(73) Assignee: Draios, Inc., Davis, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/905,455

(22) Filed: Feb. 26, 2018

(65) Prior Publication Data

US 2018/0248767 A1 Aug. 30, 2018

Related U.S. Application Data

(63) Continuation of application No. 15/224,226, filed on Jul. 29, 2016, now Pat. No. 9,954,740, which is a (Continued)

(51) Int. Cl.
*H04L 12/24* (2006.01)
*H04L 12/26* (2006.01)
(Continued)

(52) U.S. Cl.
CPC .......... *H04L 41/14* (2013.01); *G06F 11/3006* (2013.01); *G06F 11/3065* (2013.01);
(Continued)

(58) Field of Classification Search
CPC ........ H04L 43/045; H04L 12/26; G06F 12/26
See application file for complete search history.

(56) References Cited

U.S. PATENT DOCUMENTS 7,382,371 B1   6/2008  Ciabarra
7,930,381 B2 *  4/2011  Attanasio ............. H04L 41/046
                                           709/223

(Continued)

FOREIGN PATENT DOCUMENTS

WO   WO 2011/088256 A2   7/2011

OTHER PUBLICATIONS

"Rap Genius responds to Heroku's call for 'respect' amid allegations of fraud" available: http://venturebeat.com/2013/03/02/rap-genius-responds, retrieved Jul. 30, 2013, dated Mar. 2013 (8 pages).

(Continued)

*Primary Examiner* — Arvin Eskandarnia
(74) *Attorney, Agent, or Firm* — Hickman Palermo Becker Bingham LLP; Adam C. Stone

(57) ABSTRACT

Systems and methods for performance and security management of the computing infrastructure that supports an application deployed in a hosted computing environment are described. In one embodiment, for example, a system comprises agents installed on hosts. The agents capture and record system events from operating systems on the hosts that result from application component processes executing on the hosts. The system further includes a collection and analysis engine that obtains captured and recorded system events from the agents, identifies captured and recorded system events that pertain to an application transaction, and produces, from the identified system events, metric data reflecting quantity of computing resources used by the application component processes to process the application transaction. The system also includes a web dashboard that presents the metric data to a user, for example, on a web page.

20 Claims, 25 Drawing Sheets

Related U.S. Application Data continuation of application No. 13/953,970, filed on Jul. 30, 2013, now Pat. No. 9,432,270.

(51) Int. Cl.
*H04L 29/08* (2006.01)
*G06F 11/32* (2006.01)
*G06F 11/30* (2006.01)
*G06F 11/34* (2006.01)

(52) U.S. Cl.
CPC ........ *G06F 11/323* (2013.01); *G06F 11/3495* (2013.01); *H04L 41/069* (2013.01); *H04L 43/045* (2013.01); *H04L 67/02* (2013.01); *H04L 67/10* (2013.01); *G06F 2201/87* (2013.01)

(56) References Cited

U.S. PATENT DOCUMENTS

| | | | |
|---|---|---|---|
| 2005/0022185 A1* | 1/2005 | Romero | G06F 11/3409 718/100 |
| 2005/0107985 A1 | 5/2005 | Agrawal et al. | |
| 2006/0085166 A1* | 4/2006 | Ochi | G06F 11/3495 702/186 |
| 2006/0277307 A1 | 12/2006 | Bernardin et al. | |
| 2008/0295095 A1* | 11/2008 | Watanabe | G06F 11/0712 718/1 |
| 2008/0301763 A1* | 12/2008 | Sasaki | G06F 3/065 726/1 |
| 2009/0144420 A1* | 6/2009 | Attanasio | H04L 41/046 709/224 |
| 2011/0099561 A1 | 4/2011 | Karakkattillathu | |
| 2011/0302569 A1 | 12/2011 | Kunze et al. | |
| 2012/0278482 A1 | 11/2012 | Alon et al. | |
| 2012/0303805 A1 | 11/2012 | Simpson et al. | |
| 2012/0324290 A1 | 12/2012 | Chen et al. | |
| 2013/0014107 A1 | 1/2013 | Kirchhofer | |
| 2013/0205020 A1 | 8/2013 | Broda et al. | |
| 2015/0039745 A1 | 2/2015 | Degioanni | |
| 2016/0337199 A1 | 11/2016 | Degioanni | |

OTHER PUBLICATIONS

"AppDynamics" available: http://www.appdynamics.com, retrieved Jul. 30, 2013, dated 2013 (5 pages).
"AppFirst" available: http://www.appfirst.com/sigreferral=mainCTA&plan=p), retrieved Jul. 30, 2013, copyright 2012-2013 (3 pages).
"Application performance management" available: http//en.wikipedia.org/wiki/Application_performance_management, retrieved Jul. 30, 2013, dated Jul. 2013 (5 pages).
"Berkeley Packet Filter", available: http://en.\wikipedia.org/wiki/Berkeley_Packet_Filter, retrieved Jul. 30, 2013, dated Jul. 2013 (2 pages).
"BlueStripe Software—Transaction and Application Monitoring" available:http://bluestripe.com, retrieved Jul. 30, 2013, copyright 2009-2013 (2 pages).
"Capacity management", available: http://en.\wikipedia.org/wiki/Network_performance_management, retrieved Jul. 30, 2013, dated Jun. 2013 (4 pages).
"Catch Application Problems Before Your Customers Do!" available: http//optier.com, retrieved Jul. 30, 2013, dated Jul. 2013 (3 pages).
"CloudWeaver®" available: http://lyatiss.com, retrieved Jul. 30, 2013, copyright 2013 (1 page).
"A web & mobile Developer's Best Friend for better performing apps" copyright 2008-2013 (6 pages).
"pcap" available: http//en.wikipedia.org/wiki/Libpcap, retrieved Jul. 30, 2013, dated Jun. 2013 (4 pages).
Wireshark available: http://en.wikipedia.org/wiki/Wireshark, retrieved Jul. 30, 2013, dated Jul. 2013 (4 pages).
"Riverbed Technology" available: http://en.wikipedia.org/wiki/Riverbed_Technology, retrieved Jul. 30, 2013, dated Jul. 2013 (6 pages).
"strace" available: http://en.wikipedia.org/wiki/Strace, retrieved Jul. 30, 2013, dated Jun. 2013 (3 pages).
"tcpdump" available: http:/en.wikipedia.org/wiki/Tcpdump, retrieved Jul. 30, 2013, dated May 2013 (3 pages).
"The Leading Cloud Operations Optimization Service" available: http://www.new\em.com, retrieved Jul. 30, 2013, copyright 2010-2013 (2 pages).
Are you . . . Managing modern applications? available: http://boundary.com, retrieved Jul. 30, 2013, copyright 2010-2013 (2 pages).
Current Claims in application No. PCT/US2014/035040, dated Sep. 2014, 8 pages.
International Searching Authority, "Search Report" in application No. PCT/US2014/035040, dated Sep. 18, 2014, 11 pages.
Scalyr Blog available: http://blog.scalyr.com/2012/10/16/a-systematic-look-at-ec2-10, retrieved Jul. 30, 2013, dated Oct. 2012 (27 pages).
"LTTng" available: http://en.wikipedia.org/wiki/LTTng, retrieved Jul. 30, 2013, dated Apr. 2013 (2 pages).
U.S. Appl. No. 14/527,741, filed Oct. 29, 2014, Notic of Allowance, dated Sep. 17, 2015.
U.S. Appl. No. 13/953,970, filed Jul. 30, 2013, Interview Summary, dated Dec. 16, 2015.
U.S. Appl. No. 13/953,970, filed Jul. 30, 2013, Office Action, dated May 20, 2015.
U.S. Appl. No. 13/953,970, filed Jul. 30, 2013, Notice of Allowance, dated Apr. 21, 2016.
U.S. Appl. No. 13/953,970, filed Jul. 30, 2013, Final Office Action, dated Oct. 14, 2015.
Degioanni, U.S. Appl. No. 15/224,226, filed Jul. 29, 2016, Notice of Allowance, dated Nov. 27, 2017.

* cited by examiner

PERFORMANCE AND SECURITY MANAGEMENT OF APPLICATIONS DEPLOYED IN HOSTED COMPUTING ENVIRONMENTS

CROSS-REFERENCE TO RELATED APPLICATIONS; BENEFIT CLAIM

This application claims the benefit as a continuation of application Ser. No. 15/224,226, filed Jul. 29, 2016; which is a continuation of Ser. No. 13/953,970, filed Jul. 30, 2013, now U.S. Pat. No. 9,432,270, issued Aug. 30, 2016, the entire contents of each of which is hereby incorporated by reference for all purposes as if fully set forth herein. The Applicant(s) hereby rescind any disclaimer of claim scope in the parent application(s) or the prosecution history thereof and advise the USPTO that the claims in this application may be broader than any claim in the parent application(s).

This application is related to U.S. patent application Ser. No. 14/527,741, filed Oct. 29, 2014, issued Jan. 26, 2016 as U.S. Pat. No. 9,246,773.

TECHNICAL FIELD

The disclosed embodiments relate generally to managing performance and security of computer systems and, more particularly, to managing performance and security of applications deployed in hosted computing environments and the computing infrastructure that supports such applications.

BACKGROUND

Historically, users of information technology (IT) management solutions have been divided into two separate categories: software developers and network/system administrators. This was largely the result of relatively static computer hardware infrastructure dedicated to running software applications. In these environments, software developers focused primarily on developing application functionality. Administration of hardware infrastructure on which applications were deployed was delegated to network/system administrators.

The software industry has, in response, developed management solutions to meet the needs of these two types of users, including Application Performance Management (APM) solutions for software developers and Network Performance Management (NPM) solutions for network/system administrators.

Generally, APM solutions focus on providing metrics that measure the quality of service that users of an application experience when using the application. For example, there are existing APM solutions that provide metrics that measure response time of transactions of interest. Unfortunately, many of these existing APM solutions require bytecode instrumentation of the application to provide metrics. While bytecode instrumentation can be effective in identifying issues with the application software itself, bytecode instrumentation often provides only indirect visibility into the computing infrastructure that supports the application. Such supporting computing infrastructure includes, for example, CPU, memory, network, and data storage resources underlying the execution of the application software. In addition, a given bytecode instrumentation technique often works only with specific a programming language. For example, a particular bytecode instrumentation technique may be available for application components programmed in the JAVA programming language. However, an application may be composed of components developed in other programming language such as, for example, C/C++ or other programming languages. A performance and security management solution that requires multiple different bytecode instrumentation techniques for application components programmed in different programming languages is less than ideal because of the added overhead to the developer and/or system administrator in developing and managing each of the different techniques.

APM solutions are distinct from, but often used in conjunction with, NPM solutions. Typically, NPM solutions operate by capturing and analyzing network communications between networked application components. Consequently, while NPM solutions can provide visibility at the network communication layer, they do not provide much, if any, visibility into applications themselves or the supporting system infrastructure.

Recent changes in the way applications are built and deployed present new challenges to which existing APM and NPM solutions are not well suited. Existing solutions were designed on the assumption that applications were relatively static, developed with a small number of well-known and understood tools, platforms, and languages, required relatively few upgrades, and operated in a dedicated enterprise computing environment. These assumptions break down for applications deployed in "hosted" computing environments. In hosted computing environments, computing resources are centralized, for example, in a data center or other hosting facility. Hosted computing environments may be generally categorized into one of two categories: public and private. In private hosted computing environments, enterprise applications of differing criticality share the same computing infrastructure. In public hosting environments, applications of different organizations or companies share the same infrastructure.

In some hosted computing environments, applications can be rapidly developed and deployed without requiring services of network/system administrator to provision computing infrastructure. Such hosted computing environments have precipitated the introduction of a new type of user of application and network/system management solutions: the developer and operations person (or just "devop" for short). The devop often has the combined responsibilities of previously separate positions, including software development, quality assurance, and IT operations responsibilities.

With some hosted computing solutions, applications can be put into production and changed rapidly at a fast pace. Continued improvements in price and performance of commodity computing hardware along with the emergence of low cost reliable open source software platforms result in deploying many of these applications in scaled out, distributed hosted environments, often spanning multiple data centers, and private and public hosted computing environments. Often these applications are run on virtualized infrastructure in dynamic and shared environments—either in private hosted environments where multiple applications of the same enterprise share infrastructure or in public hosted environments where applications of multiple customers share infrastructure.

At the same time as the rise of hosted computing solutions for deploying applications, there has been a proliferation in tools, platforms, and programming languages for developing applications. Today, many applications are no longer developed with a small handful of technologies such as HTML and Java. Instead, in addition to these technologies, a wide variety of newer, diverse technologies are being used for application development (e.g., Ruby on Rails, PHP, Ajax, JavaScript, Python, and many others). As a result, a management solution that focuses on a specific tool, platform, or programming language is inadequate for many of today's applications.

While some hosted computing solutions provide the capability to automatically provision computing resources as needed to allow for dynamic scalability, for example, during traffic bursts, it is still largely the responsibility of the devop to ensure the performance of applications is adequate (e.g., meets a minimum quality of service level). Existing APM and NPM solutions are inadequate for the hosted computing environment because they provide only limited visibility into computing infrastructure in hosted computing environments that supports an application or operate only with specific tools, platform, or programming languages.

Devops and others thus have a long-felt, unmet need for a management solution providing an end-to-end view of their applications and a top-to-bottom view of their application stack including the supporting infrastructure to be able to assure service quality in hosted computing environments. There is a need to support a variety of tools, platforms, and programming languages and for a solution that is easy to deploy and use.

SUMMARY

The above deficiencies and other problems associated with exiting solutions for managing performance and security of applications deployed in hosted computing environments and the supporting computing infrastructure are reduced or eliminated by the disclosed systems, methods, and techniques. In one embodiment, for example, a data processing system is provided for managing performance of computing infrastructure that delivers an application deployed on a plurality of hosts in a hosted computing environment. The system comprises a plurality of agents installed on the plurality of hosts for capturing system events that occur because of application component processes executing on the plurality of hosts. The system also includes a collection and analysis engine that obtains captured system events from the plurality of agents, identifies captured system events that pertain to an application transaction, and produces, from the identified system events, metric data reflecting usage of computing resources by the application component processes to process the application transaction. The system further includes a web dashboard that presents the metric data produced by the collection and analysis engine to a user.

In another embodiment, for example, a method for managing performance of computing infrastructure that delivers an application deployed on a plurality of hosts in a hosted computing environment. The method includes a plurality of agents installed on the plurality of hosts capturing system events that occur because of application component processes executing on the plurality of hosts. The method also includes one or more collection and analysis computers having at least a processor and memory obtaining captured system events from the plurality of agents, identifying captured system events that pertain to an application transaction, and producing, from the identified system events that pertain to the application transaction, metric data reflecting usage of computing resources by the application component processes to process the application transaction. The method further includes one or more web dashboard computers presenting the metric data produced by the collection and analysis engine to a user.

Thus, a system and method are provided. The system and method address needs of devops and others in managing applications and supporting computing infrastructure deployed in hosted computing environments. Such system and method may complement or replace conventional systems and methods for application and infrastructure performance and security management.

DETAILED DESCRIPTION OF EMBODIMENTS

Figure 1:
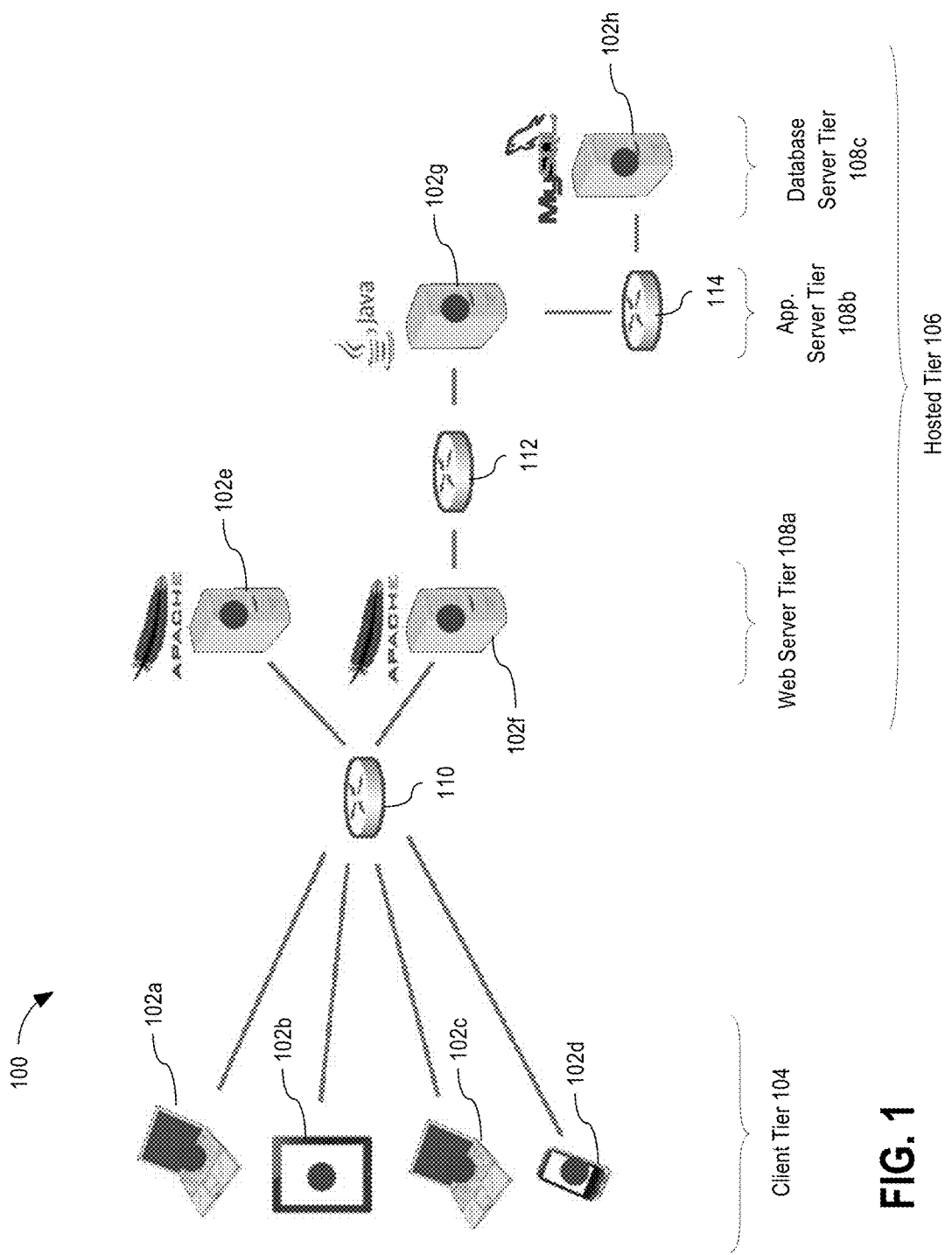
FIG. 1 illustrates an example hosted computing environment delivering an application, in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Overview

In some embodiments, an agent running inside or outside the operating system (hereinafter "OS agent") collecting system events from the perspective of the operating system works in conjunction with a collection and analysis engine (hereinafter "CAS engine") to provide the ability to manage the performance and security of the computing infrastructure that delivers an application deployed in a hosted computing environment. More particularly, the operating system is instrumented with the OS agent that is configured logically underneath the processes running on the operating system (e.g., web server processes), capturing the processes' interaction with the operating system including CPU scheduling events, processing life-cycle and management events, inter-process communication events, memory allocation and management events, disk I/O events, and network I/O events. By instrumenting the operating system with the OS agent, all of a process' interaction with the operating system may be captured for analysis. Some or all of the hosts that are part of the application infrastructure, including clients and servers, can be configured with the OS agent for capturing system events.

Captured events are collected and analyzed by the CAS engine. The CAS engine can be in a private hosted computing environment or in a public hosted computing environment. Further, a portion of the CAS engine can operate in the OS agent. The CAS engine processes the system events collected by the OS agent. Results of processing are presented to users through a graphical user interface termed a "web dashboard". Through the web dashboard, users can perform several tasks including viewing application performance metrics in real-time, historical performance trends, and alerts. The web dashboard also provides interactive features allowing users to drill down into system event details and discover root causes of application performance problems.

In some embodiments, the web dashboard presents a "transaction segmentation view" of an application transaction that allows a user to identify which computing resources were used to process the application transaction and how much time was spent using computing resources to process the application transaction. In this context, an "application transaction" starts when a client request (e.g., a HTTP request) is received at a server and ends when the server returns the fully body of a response (e.g., a HTTP response) to the request. The application transaction may span multiple server tiers of the application infrastructure (e.g., a web server tier, application server tier, and database tier).

In some embodiments, the transaction segmentation view allows a viewer to identify which computing resources were used to process an application transaction and how much time was spent by computing resources processing the application transaction across all of the server tiers. For example, the transaction segmentation view may indicate the portion or percentage of the entire application transaction spent performing network I/O across all server tiers and the portion of percentage of the entire application transaction spent performing file I/O across all of the server tiers. The transaction segmentation view also allows a user to identify in which server tiers application transaction processing occurred. For example, the transaction segmentation view can indicate how much CPU processing for a transaction was performed in the web server tier and how much was performed in the database server tier.

In some embodiments, the CAS engine builds indexes on system events captured by the OS agent and on results of processing the events. The indexes are used for querying for specific events that match a specified set of criteria. Results of querying are useful for tracing the sequence of steps involving in a hacker penetration of the application or a virus attack or other security breach and for tracking user activity.

These and other embodiments are explained in greater detail below.

Example Hosted Computing Environment

In an embodiment, the performance and security management solution is implemented in a hosted computing environment that hosts an application. The application is typically divided into two general tiers: a client tier and a hosted tier. The client tier and the hosted tier are typically connected by the Internet but may be connected by another type of a network (e.g., a WAN or a LAN).

The hosted tier is typically further divided into one or more server tiers. For example, the hosted tier may have a web server tier for receiving and responding to requests from client devices in the client tier and implementing presentation functionality of the application, an application server tier implementing business logic functionality of the application, and a database server tier for persistently storing application data. Each server tier typically includes one or more hosts. Each host has a running operating system (e.g., WINDOWS, UNIX, etc.) and software implementing or supporting the application (e.g., web servers, application servers, database servers) running on top of the operating system. Often, the host is a virtualized host (e.g., a virtual machine instance) that virtualizes hardware in software.

FIG. 1 is a schematic diagram illustrating an example hosted computing environment 100 for delivering an application, in accordance with some embodiments. The application can be virtually any client-server application in which clients make network requests of servers and the servers generate and return responses to the requests to the clients. For example, the application can be a web-based application in which the clients are web browsers or mobile applications that make HTTP or HTTPS requests of web servers and the web servers, possibly in conjunction with one or more other servers, generate and return HTTP or HTTPS responses to the clients.

Environment 100 includes hosts 102a-102h (generally, "host 102"). Each host 102 corresponds to a physical computing device (e.g., a server computer, a desktop computer, a laptop computer, a tablet computer, a mobile phone) or a virtualized computing device (e.g., a virtual machine instance) that executes on a physical computing device. Each host 102 is configured with an operating system. Different hosts 102 may be configured with different operating systems. The operating system a host 102 is configured with can be a conventional operating system such as an open-source operating system or a proprietary operating system. For example, the operating system can be a MICROSOFT WINDOWS, UNIX, IOS, ANDROID, OS X based operating system or variant thereof.

Environment 100 is divided into tiers. At the highest level, environment 100 is divided into client tier 104 and hosted tier 106. Client tier 104 includes client hosts 102a-102d (generally, "client host 102"). Client tier 104 may have more or fewer client hosts than is shown in environment 100. Hosted tier 106 includes server hosts 102e-102h (generally, "server host 102"). Hosted tier 106 may have more or fewer server hosts than is shown in environment 100.

Hosted tier 106 is further divided into server tiers 108a-108c (generally, "server tier 108"). Web server tier 108a includes web server hosts 102e and 102f (generally, "web server host 102"). Web server tier 108a may have more or fewer web server hosts than is shown in environment 100. Application server tier 108b includes application server host 102g. Application server tier 108b may have more or fewer application server hosts than is shown in environment 100. Database server tier 108c includes database server host 102h. Database server tier 108c may have more or fewer database server hosts than is shown in environment 100.

In this example, web server hosts 102 run Apache web server software, application server host 102g runs Java-based application server software, and database server host 102h runs MySQL database server software. However, in other embodiments the server hosts 102 may run different software and server hosts 102 are not limited to any software or any web server, application server, or database server software.

Client hosts 102 in client tier 102 are connected to web server hosts 102 in web server tier 108a via network 110. Network 110 may include the public internetworks popularly termed the Internet. However, network 110 need not involve the Internet. For example, network 110 may be a Local Area Network (LAN). Web server hosts 102 and application server host 102g are connected by network 112. Typically, network 112 will not include the Internet and will instead be a LAN or other dedicated network. Similarly, network 114 connecting application server host 102g and database server host 102h will not include the Internet and will instead be a LAN or other dedicated network. Although separate networks in environment 100, network 112 and network 114 may be the same network.

Hosted tier 106 can operate in a private hosted computing environment, a public hosted computing environment, or other distributed computing environment over a network. In a private hosted computing environment, a pool of computing resources (e.g., virtual machines, network, and storage) is operated for a single company or organization. In a public hosted computing environment, a pool of computing resources is shared among multiple customers of a hosting provider. Some existing performance management tools and solutions are inadequate regarding the visibility they provide to users as to why an application is performing poorly. For example, a devop may receive general complaints from users that the application is responding slowly but may not be able to easily determine from these tools and solutions whether the application is CPU-bound, memory-bound, or I/O bound.

System Architecture

In accordance with some embodiments, the performance and security management solution involves instrumenting hosts at the operating system layer with an OS agent. The OS agent captures system events as they occur on the hosts from the perspective of the operating system. In this description, a "system event" refers to information collected from an operating system that reflects a process' interaction or absence of interaction with the operating system at a particular point in time or within or over a time period. In some embodiments, the OS agent intercepts system calls from the application layer on the hosts to the operating system layer and records information collected from intercepted system calls as system events.

In general, a system call is processed by the operating system in a kernel or other processor privileged mode. Typically, a system call is accomplished by the operating system by changing or switching a processor execution mode from a less-privileged user mode to a more-privileged kernel mode.

In some embodiments, once intercepted by the OS agent, relevant information about the system calls is recorded as system events in local memory of the host. The system calls may correspond to disk I/O operations, network I/O operations, memory allocation and management operations, process and thread creation and control operations, inter process communication operations, file and directory operations, among other operations or services the operating system layer provides to the application layer via a system call interface. The OS agent may also intercept CPU process and thread scheduling events which also can be recorded as system events.

By instrumenting the operating system on the hosts with the OS agent, relevant interaction with the operating system by application components (e.g., web servers, application servers, and database servers) can be captured for performance and security analysis. Further, instrumenting the operating system with the OS agent allows the OA agent to be application component agnostic. That is, the OS agent is not limited to capturing system events for only a predetermined set of application components or application components programmed in a programming language. Instead, the OS agent can capture system events for any type of application component that executes as a process on the instrumented operating system.

In some embodiments, system events recorded by the OS agent are provided to a collection and analysis engine ("CAS engine") for further analysis and processing. For example, the OS agent may send system events to the CAS engine in one or more network messages. The processing performed by the CAS engine may be performed to provide different useful functions including, for example, resource and application mapping, charting, reporting, trending, alerting, baselining, event decoding and display, application troubleshooting and drill-down, and capacity planning. In addition, or alternatively, the OS agent can process system events locally and send the results of the processing to the CAS engine. For example, the OS agent can compute an average disk I/O for an application level process for a time period based on a number of system events collected and send the average disk I/O calculation result to the CAS engine instead of or in addition to the raw system events.

In accordance with some embodiments, the results of processing collected system events are presented to users (e.g., devops) through a web dashboard. Through the web dashboard, the user can perform several tasks including monitoring infrastructure performance and dependencies in real-time, monitoring application-related performance metrics, viewing historical trends of metrics, examining alerts, interacting with collected system events and results of processing system events including drilling down into event details and discovering root causes of application problems.

Figure 2:
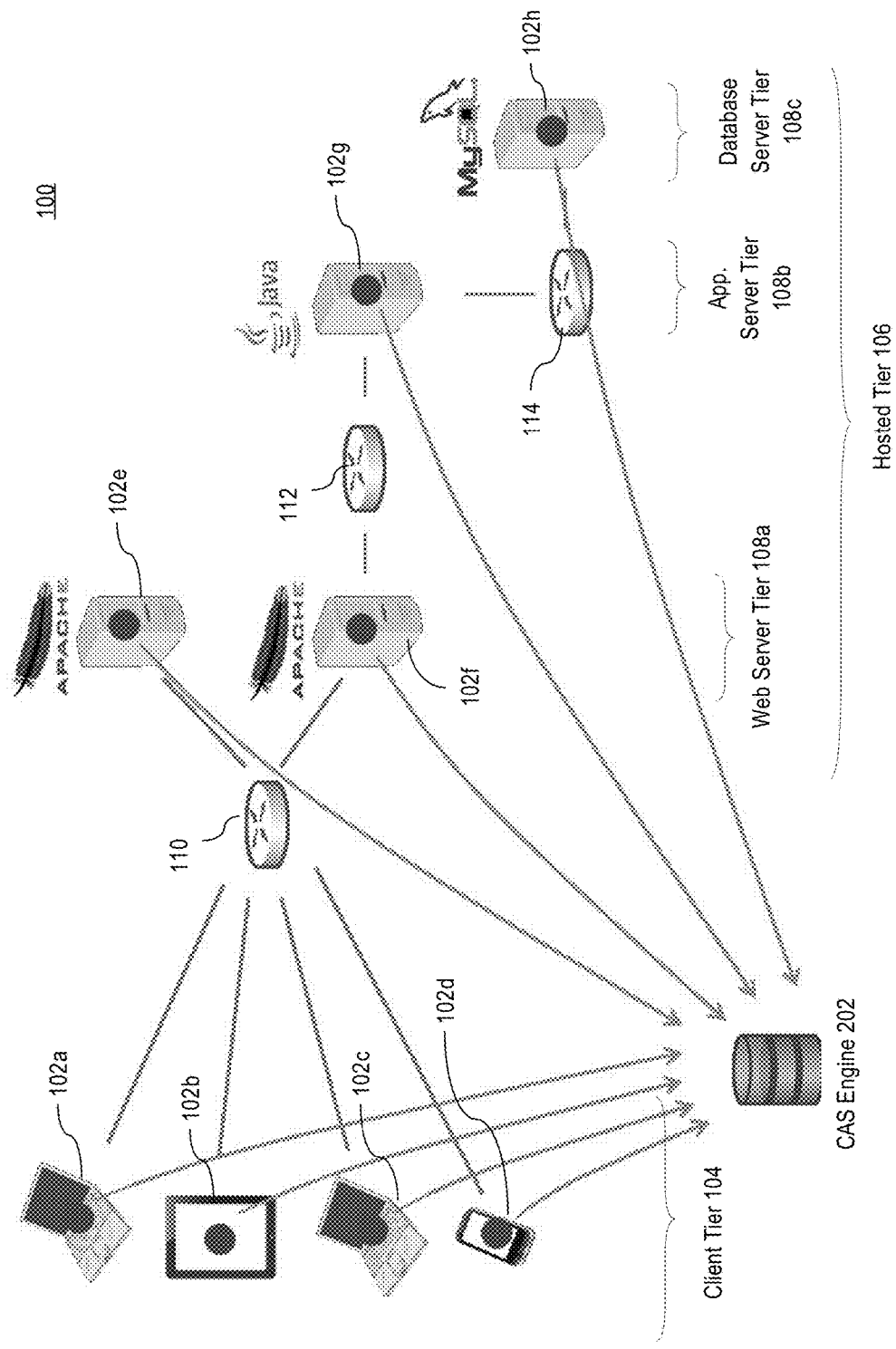
FIG. 2 illustrates the example hosted computing environment of FIG. 1 with the addition of a collection and analysis engine and hosts configured with an operating system agent, in accordance with some embodiments.

FIG. 2 is a schematic diagram illustrating environment 100 of FIG. 1 but with the addition of collection and analysis system 202 (or "CAS engine 202"), in accordance with some embodiments. Hosts 102*a* through 102*h* are each configured with the OS agent. However, not all hosts need be configured with the OS agent. For example, only hosts in the hosted tier may be configured and hosts in the client tier not configured with the OS agent. For example, hosts 102*a*-102*d* in client tier 104 may not be configured with the OS agent but hosts 102*e*-102*h* in the hosted tier 106 may be configured with the OS agent.

In this example, OS agents on hosts 102*a* through 102*h* collect system events from application components executing on the hosts 102. The system events and/or results of processing the system events are sent to CAS engine 202. In some embodiments, CAS engine 202 provides a HTTP or HTTPS interface to hosts 102 thereby allowing hosts 102 to function as HTTP clients connecting to CAS engine 202 functioning as an HTTP server. By doing so, reconfiguration of network firewalls in environment 100 to allow network communication between the OS agents and the CAS engine 202 may be avoided in many circumstances.

CAS engine 202 can be implemented in software executing on one or more computing devices. CAS engine 202 may be operated in the same data center facility or hosting facility as hosts 102 of hosted tier 106. Alternatively, CAS engine 202 may be in different data center facility or hosting facility. For example, CAS engine 202 may be in a private data center or a data center or hosting facility other than the data center facility or hosting facility in which hosted tier 106 is located.

In some embodiments, system events collected by an OS agent are collected in a local buffer on the host. As mentioned, the system events can be sent to CAS engine 202 as collected in raw form. Alternatively, some or all the collected system events can be processed locally by the OS agent and the results of the processing sent to CAS engine 202. In addition, the OS agent may perform system event filtering. That is, the OS agent may not process or send to CAS engine 202 certain collected system events specified by system event filtering criteria. The filtering criteria may be predetermined. For example, the filtering criteria may be based on user input indicating performance metrics the user is currently interested in. Accordingly, the OS agent may filter out system events that are not needed by CAS engine 202 to produce the interesting metrics.

After system events have been collected and processed, CAS engine 202 can perform functions on the collected and processed data. The results of processing can be presented to a user through a web dashboard. Through the web dashboard, the user can perform tasks such as view performance metrics in real-time, looking at historical metric trends, monitoring alerts generating by CAS engine, and interacting with collected and processed data to spot application performance and security issues including drill-down into system event details and discovering root causes of performance and security issues.

Figure 3:
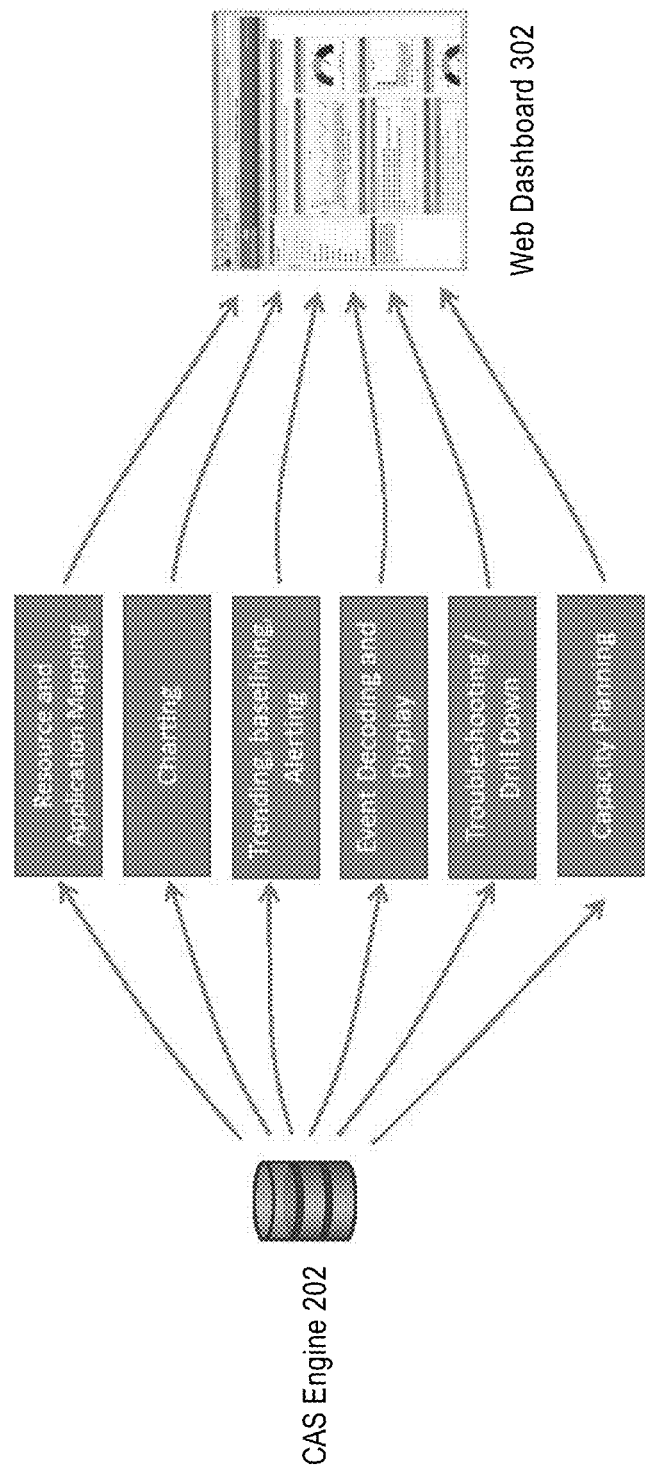
FIG. 3 illustrates some of the functions that may be performed by the collection and analysis engine in conjunction with a web dashboard based, in accordance with some embodiments.

FIG. 3 illustrates some of the functions that may be performed by CAS engine 202 based on collected and processed system events, in accordance with some embodiments. The functions include, but are not limited to, resource and application mapping, charting, trending, base-lining, alerting, event decoding and display, troubleshooting and drill-down, and capacity planning. As shown, the results of processing may be presented to users in a web dashboard 302. In some embodiments, interaction with the web dashboard 302 may be made by a user using conventional web browser software such as EXPOLORER, SAFARI, CHOME, or the like. Alternatively, web dashboard 302 may be implemented as a dedicated software program installed on a user's computing device.

Operating System Instrumentation

Historically, capturing application performance and security data has been accomplished by collecting data at the network layer or by instrumenting application bytecode. These approaches are deficient for capturing performance and security data in hosted computing environments. Instrumenting the network layer by capturing network packets that span network ports or by collecting summaries of network flows provides visibility only into the network layer. Instrumenting application bytecode typically only works with certain tools, platforms, and languages (e.g., JAVA).

In contrast to instrumenting only the network layer and/or application bytecode, the performance and security management solution of some embodiments involves instrumenting the operating system of hosts in the hosted computing environment. Operating system instrumentation allows the OS agent to sit underneath the processes of application components, capturing their interaction with the operating system. For example, operating system instrumentation may be accomplished with an operating system kernel component, for example, a kernel module or kernel driver, installed into the operating system. The kernel component may leverage existing instrumentation frameworks such as tracepoints, kernel markers, ftrace, ktrace, etc. In addition, or alternatively, operating system instrumentation may be accomplished with a user level process that leverages an existing kernel event collection framework such as, for example, Event Tracing for Microsoft Windows.

Through operating system instrumentation, system events generated by application components (e.g., web servers, application servers, database servers, etc.) executing as processes on the operating system are captured. System events include, but are not limited to, process and thread scheduling events, process and tread creation and management events, inter-process communication events, memory allocation and management events, disk and file system I/O events, and network I/O events.

CPU scheduling events include, but are not limited to, when a process or thread is running and becomes blocked, is running and becomes preempted, and is blocked and becomes runnable.

A process is an address space of a host with one or more threads executing within that address space, and associated system resources for those threads. Some of the associated system resources may be shared among all the threads within a process. For example, all of the threads may share a process identifier (process ID), a parent process identifier (parent process ID), current working directory, and other system resources.

A thread is a single flow of control within a process. Each thread may have its own identifier (thread ID) and required system resources to support a flow of control. Process and thread creation and management events include, but are not limited, to when a process or thread is created or destroyed (killed).

Inter-process communication events include, but are not limited to, a process opening an inter-process communication channel (e.g., a socket, a message queue, a pipe, etc.) with another process on the same host, a process reading data from an inter-process communication channel, and a process writing data from an inter-process communication channel. Inter-process communication is a functionality enhancement provided by the operating system to provide a high-performance, deterministic inter-process communication facility for intra-host communication.

Memory allocation and management events include, but are not limited to, a process or thread allocating space in volatile memory and a process or thread de-allocating previous allocated space in volatile memory.

Disk and file system I/O events include, but are not limited to, a process or thread creating a new file or directory, a process or thread opening an existing file or directory, a process or thread reading data from an open file or directory, a process or thread writing data to an open file or directory, and a process or thread closing an open file or directory. A file is an object that can be written to, or read from, or both. A file may have certain attributes, including access permissions and type. A directory is a file that contains directories entries in which no two of the directories entries have the same name. A directory entry is an object that associates a filename with a file. Multiple directories entries can associate names with the same file.

Network I/O events include, but are not limited to, a process creating a new file descriptor (e.g., a socket) used as a local communications endpoint for process-to-process communication, a process establishing a network connection (e.g., a TCP connection) using such a file, a process reading data from such a file, a process writing data to such as file, and a process closing such a file. The file may be associated with local address information and remote address information. The local address information and the remote address information may each an address family identifier and addressing information specific to that address family. For example, if the address family is Internet Protocol Version 4 or Version 6, then the local and remote address information may specify a location network address, a local network port, a remote network address, and a remote network port.

Figure 4:
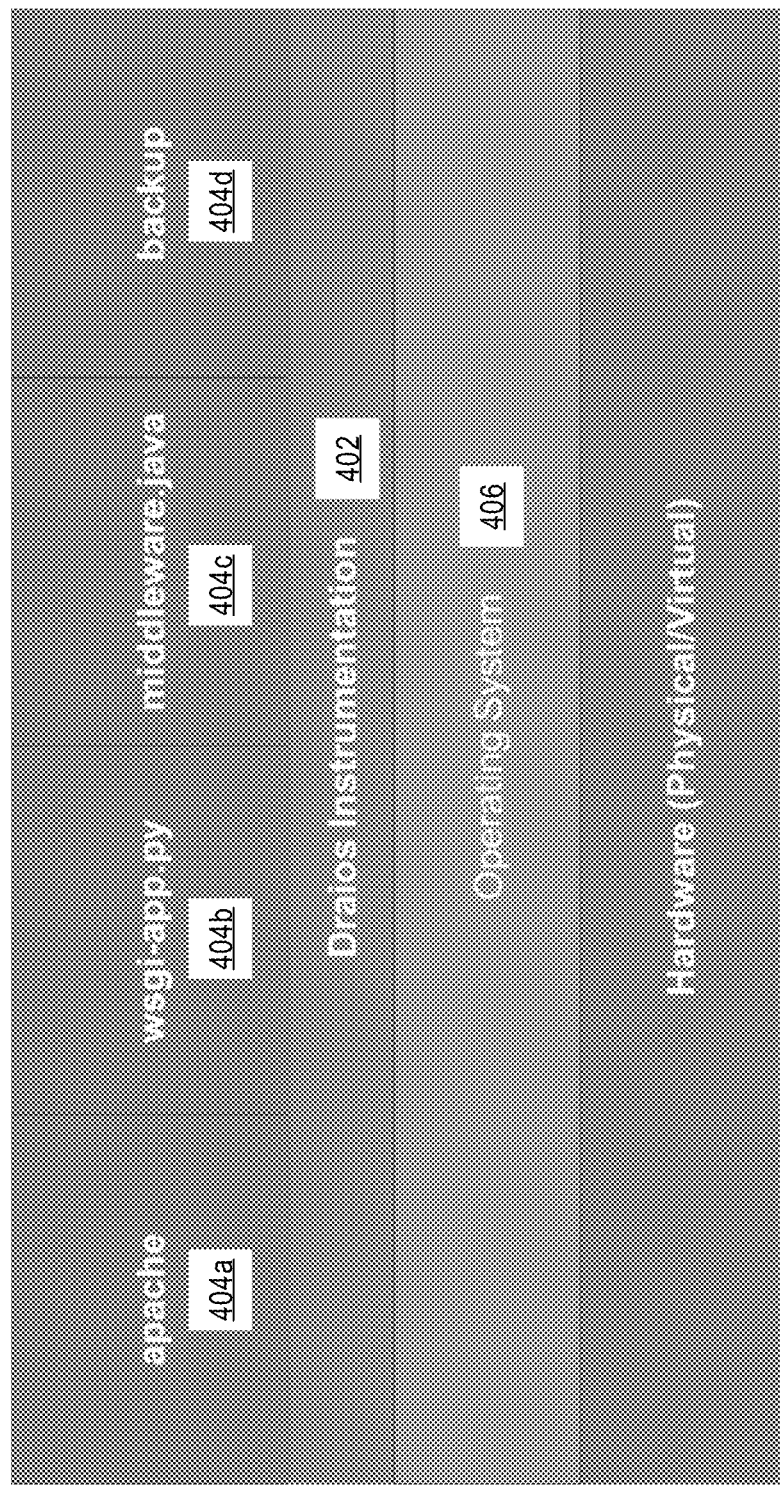
FIG. 4 illustrates where on a host operating system instrumentation can be situated, in accordance with some embodiments.

FIG. 4 illustrates where on a host the operating system instrumentation of the OS agent may be situated, in accordance with some embodiments. The operating system instrumentation 402 may be logically configured underneath the application component processes 404a through 404d, capturing their interaction with the operating system 406. In some embodiments, the operating system instrumentation resides inside the operating system, for example, as a loadable kernel module, a kernel extension, or a kernel-mode driver.

In some embodiments, in addition to or instead of residing inside the operating system, the operating system instrumentation of the OS agent resides outside the operating system as a user-level process that captures and records system events through an operating system provided interface such as, for example, operating system event logs and the proc file system on Unix-like operating systems. In both cases, whether residing inside or outside the operating system, the operating system instrumentation captures system events from the perspective of the application system.

Figure 5:
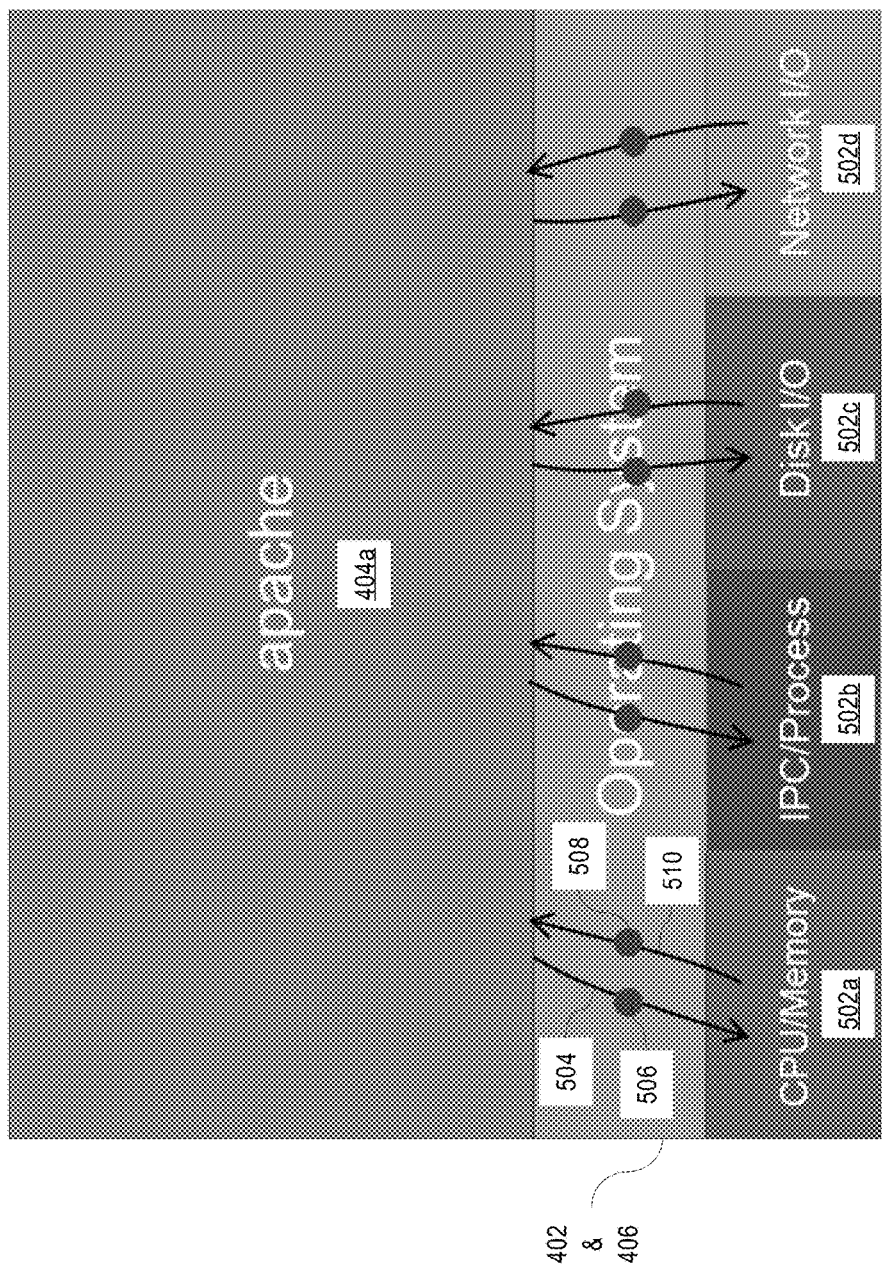
FIG. 5 illustrates operating system instrumentation for an application component process, in accordance with some embodiments.

FIG. 5 illustrates the operating system instrumentation for application component process 404a, in accordance with some embodiments. In this example, the application component is the Apache web server. As shown in FIG. 5, the operating system instrumentation 402 captures different system event types 502 including CPU scheduling and memory allocation and management events 502a, interprocess communication and process and thread creation and management events 502b, disk and file system input/output events 502c, and network input/output events 502d.

In some embodiments, a captured system event corresponds to a system call from an application component process to the operating system. For example, in FIG. 5, application component process 404a makes system call 504 to operating system 406 possibly passing input parameter values 506. For example, system call 504 may be a request to allocate volatile memory space to application component process 404a in which the amount of memory requested is passed as input parameter value 506. System call 504 is processed by operating system 406 and results returned to application component process 404a as return value 510. For example, operating system 406 may allocate a block of volatile memory and return, as return value 510, a handle to or address of the block of memory to application component process 404a. Some system calls 504 may also provide output parameter values 508 as a result operating system 406 processing.

Operating system instrumentation of the OS agent can capture a wide variety of information about a system call as a system event including, but not limited to:
- the name of the system call,
- the time of the system call,
- the process ID and/or thread ID of the application component process that made the system call,
- any parameter values input to the system call by the application component process,
- any parameter values output from the system call by the operating system,
- any return value of the system call, and/or
- the time needed by the operating system to complete the system call.

For example, where system call 504 is a request to allocate volatile memory, operating system instrumentation 402 can capture the requested amount of memory passed as input parameter value 506 to system call 504. Operating system instrumentation 402 can also capture return value 510 returned from the call 504 to allocate memory. Operating system instrumentation 402 may perform similar capturing for other types of system calls.

As discussed, system events captured by operating system instrumentation can be completely processed on local host, partially processed on the local host, or completely processed by the CAS engine. If completely processed on the local host, then only summary information is sent to the CAS engine. If partially processed on the local host, some system events are sent in raw form to the CAS engine and some system events are processed locally to create summaries that are sent to the CAS engine in lieu of or in addition to sending the system events that are summarized. If completely processed by the CAS engine, then no summation of system events occurs at the local host. The processing strategies that are used may vary in different embodiments. For example, system events captured by operating system instrumentation may be partially processed on the local host if sending the system events in raw form to the CAS engine would fill or saturate available network bandwidth to the CAS engine.

System State Information

In some embodiments, the OS agent and the CAS engine collectively maintain a set of system state information that is updated constantly as system events are collected. The state information may be maintained in volatile computer memory for fast updating. The set of state information provides a full picture of the recent state of the distributed system that delivers an application, including the recent state of application component processes. By doing so, a rich, detailed, real-time picture of a thread, a process, a file, a directory, an operating system volume, or a complete distributed application can be provided to a user through the web dashboard.

In some embodiments, the set of state information includes one or more event lists and one or more process state tables. Each OS agent on a host may maintain an event list storing recently captured and recorded system events on the host. In addition, the CAS engine may maintain an event list that aggregates system events received from multiple OS agents.

In some embodiments, each row of a process state table corresponds to a process executing on a host. Each OS agent on a host may maintain a process state table for processes executing on the host. In addition, the CAS engine may maintain a process state table that aggregates processes executing on multiple hosts.

In some embodiments, each row of a process state table may be associated with additional state tables that provide additional system state information pertinent to the corresponding process. Such additional state tables may include, for example, state tables for file descriptors, network communication endpoints (e.g., sockets), and inter-process communication channels (e.g., named pipes) that the corresponding process currently has open.

Figure 6:
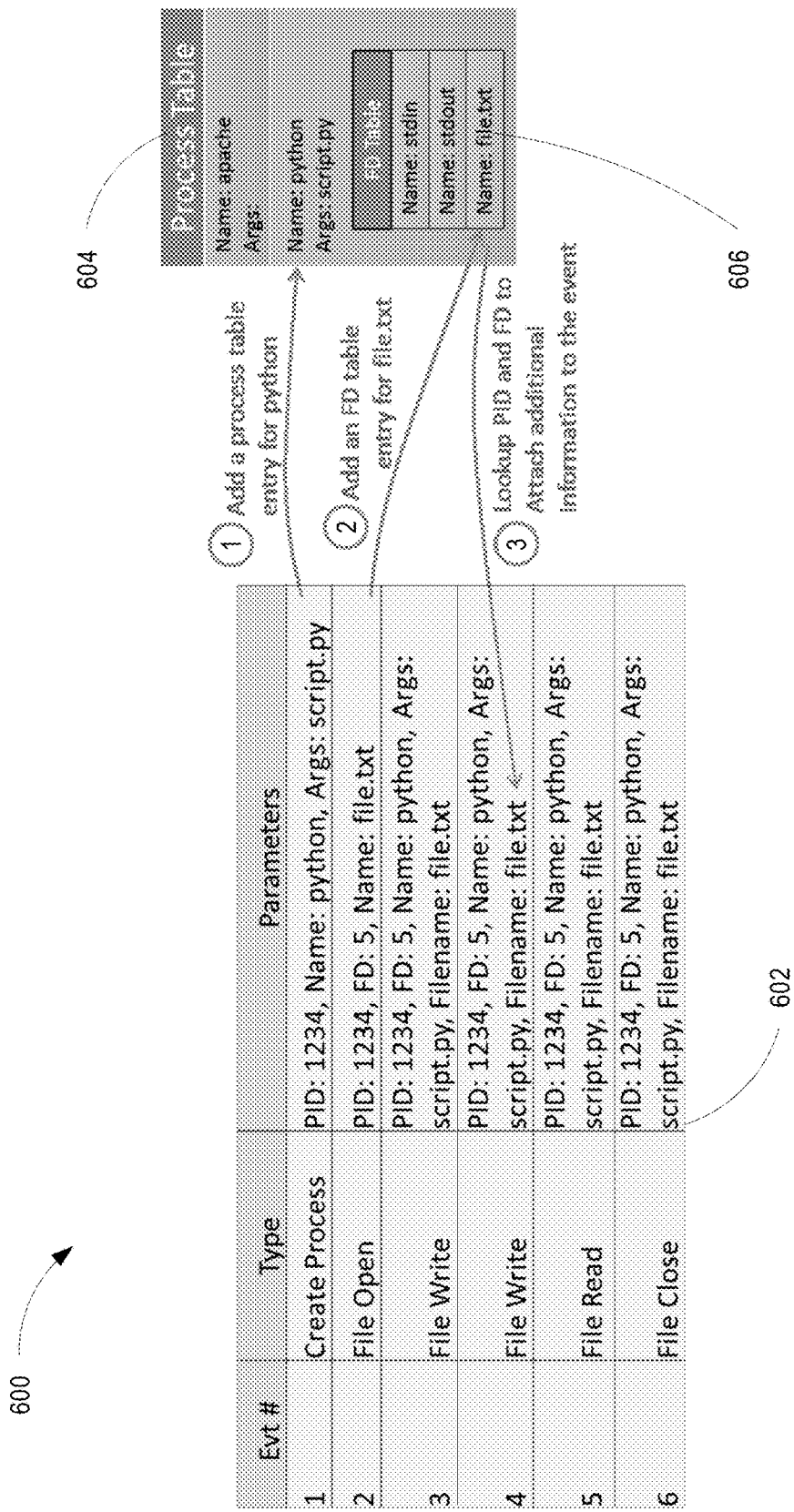
FIG. 6 illustrates a set of system state information, in accordance with some embodiments.

In some embodiments, a process state table and/or associated state tables are queried as a system event is captured so that additional contextual information that is not available from the captured system event itself can be associated with the captured event as part of the maintained system state information. For example, FIG. 6 illustrates a set of system state tables including process state table 604 and pre-process file descriptor state table 606, in accordance with some embodiments. In this example, there is also an event list 602. More or less system state tables may be maintained in other embodiments.

Each item in event list 602 represents a system event captured by operating system instrumentation. For example, event #1 corresponds to an event to create a new python process that was passed the argument "script.py". The new process was assigned the process ID 1234 by the operating system.

As system events are captured, event list 602, process state table 604 and file descriptor state table 606 are updated. For example, because of capturing event #1, a new row is added to the process table 604 for the new python process. The row added to the process state table 604 may be associated with additional information about the new python process such as, for example, the process name, process identifier, process arguments, and current working directory. At event #2, the python process opens a file named "file.txt" which is assigned file descriptor identifier 5 by the operating system. Because of capturing event #2, a new row is added to file descriptor state table 606 for the python process. The row added to the file descriptor state table 606 may be associated with additional information about the opened file such as the file name and the file descriptor identifier.

System state tables 600 may be queried for relevant contextual information to associate with a captured system event where such contextual information is not available from the captured system event itself. For example, for system event #1, pertinent contextual information about the corresponding system event may be available from captured system event itself. For example, the process name "python", the process argument "script.py", and the process identifier 1234 may be captured from the create process system call. In contrast, for system event #4, the contextual information available from the captured system event itself may include the process identifier 1234 and the file descriptor identifier 5 but not the process name "python", the process argument: "script.py", or the file name of file descriptor identifier 5: "file.txt". Using the process identifier and the file descriptor identifier captured as part of system event #4, process table 604 and file descriptor table 606 may be queried to collect additional contextual information such as the process name "python" from process table 604, the process argument: "script.py" from process table 604, and the file name of file descriptor identifier 5: "file.txt" from file descriptor table 606. This additional contextual information is recorded as part of system event #4 in event list 602.

In some embodiments, additional contextual information to associate with a captured system event is obtained from an operating system interface in addition to or instead of querying state tables. For example, additional contextual information to associate with a captured system event may be obtained from the proc file system interface on UNIX-like operating systems. Using an operating system interface such as for example the proc file system is useful to obtain additional contextual information about system events relating to processes, files, or other operating system resources that are already running or already open when the OS agent is started on a host. In this case, the OS agent may not have captured system events associated with the creation of an already running process or the opening of an existing file. Thus, the OS agent may not be able to query state tables to obtain additional contextual information relating to the already running process and already opened files. Instead, the OS agent may query an operating system interface such as for example the proc file system on some UNIX-like operating systems to obtain the additional contextual information. For example, consider a file named "file.txt" having file descriptor 7 that is opened on a host before the OS agent is started on that host. After the OS agent is started, the OS agent may capture a system event pertaining to a write of some number of bytes to file descriptor 7. Since the OS agent was not running when file "file.txt" was opened, the OS agent may not have information about the file name "file.txt" associated with file descriptor 7 when the OS agent captures the write of the bytes to file descriptor 7. However, the OS agent may capture the file descriptor identifier 7 as part of the write system call. In this case, the OS agent may query or invoke an operating system interface such as for example the proc file system on some UNIX-like operating systems to obtain the file name "file.txt" associated with file descriptor 7. In this way, additional contextual information obtained from an operating system interface can be associated with a captured system event.

By associating captured system events with additional contextual information, higher-level context surrounding captured events is created. Further, relevant metrics built on the higher-level context can be presented in the web dashboard. For example, associating captured system events with additional context information allows a set of system events to be associated with application components involved in processing an application transaction. For example, each system event can be associated with a process through the process identifier associated with the system event. Where system events are captured from multiple hosts, a unique host identifier assigned by the OS agent on a host to system events captured on that host can be used to disambiguate between the multiple hosts. The application component of a process can be determined from the name of the process when it is created. For example, the process name "httpd" may indicate a web server application component. Each system event may then be associated with an application component through the process identifier and/or host identifier associated with the system event.

Performance Management of Application Transactions

The infrastructure performance management approach based on instrumenting the operating systems of hosts, in addition to or instead of instrumenting the application stack or the network layer, enables embodiments to accurately manage the performance of the infrastructure that delivers an application.

A typical application involves clients that submit HyperText Transfer Protocol (HTTP) and/or Secure-HyperText Transfer Protocol (HTTPS) requests to one or more web servers hosted in a hosted computing environment. The web servers in turn, as part of processing the HTTP & HTTPS requests, may interact with one or more other servers such as one or more application servers and/or one or more database servers.

Different client requests may generate different types of load on the server infrastructure supporting an application. For example, some client requests may transit all server tiers, some client requests may be CPU-bound, some client requests may require servers to perform a high amount of file and/or network I/O, and some client requests may generate heavy load on database servers. For a given request or set of requests, it would be useful to a devop and others to acquire insight into which server resources are being used and how much of these resources are being used to process client requests.

In accordance with some embodiments, the system events collected and processed by the OS agent and the CAS engine are used to attribute resource usage to "application transactions". An application transaction starts when a request (e.g., a HTTP or HTTPS request) is received from a client process by a server process (e.g., a web server process) and ends when the full body of the corresponding response (e.g., a HTTP or HTTPS response) is sent by the server process to the client process.

Figure 7:
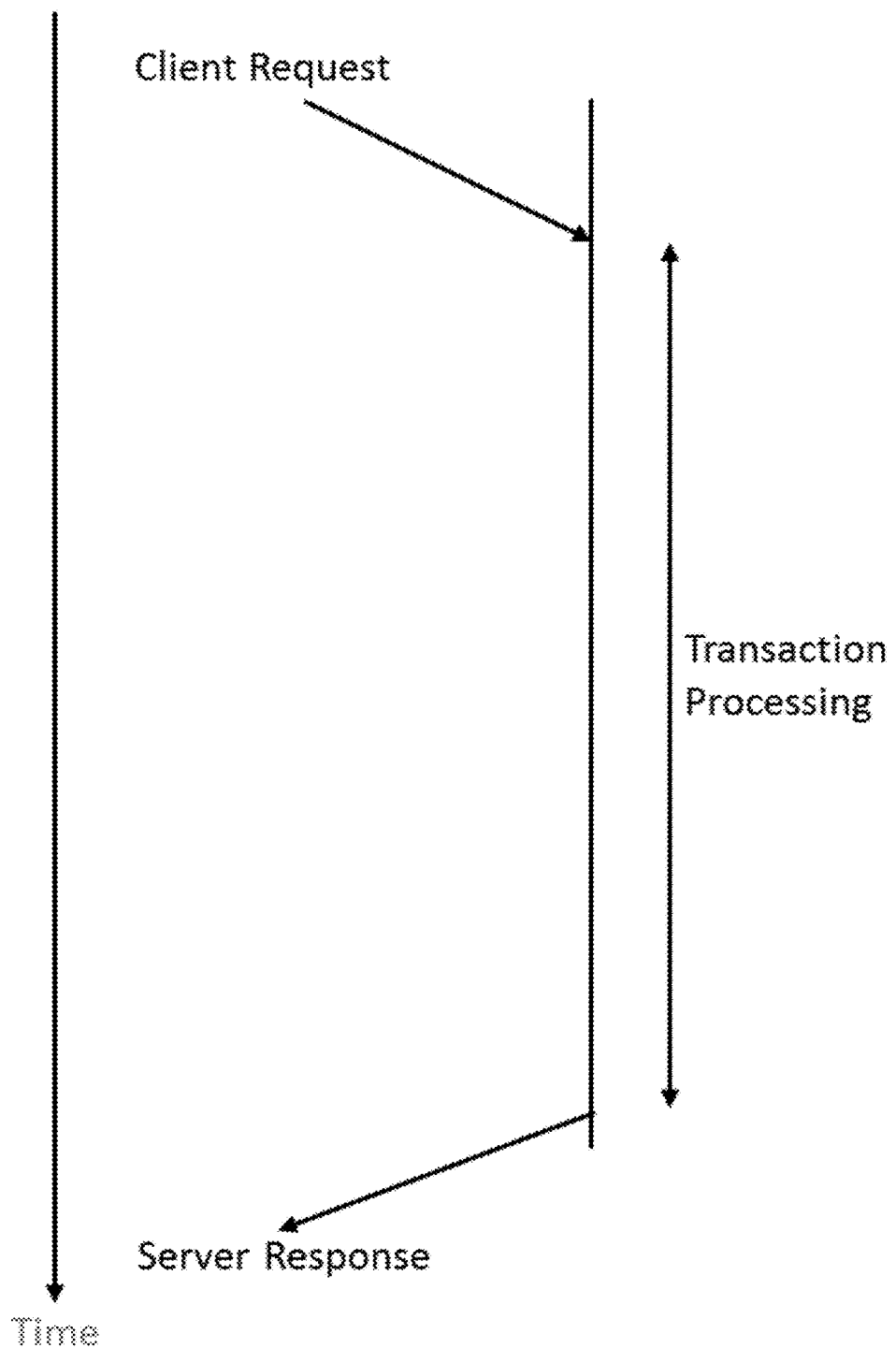
FIG. 7 illustrates an application transaction on a timeline, in accordance with some embodiments.

For example, FIG. 7 illustrates a typical application transaction on a timeline. Time increases from top to bottom of FIG. 7. A client request is sent by a client process in a client tier at a first time. At a later second time, the client request is received by a server process in a hosted tier. Some time is spent processing the client request in the hosted tier including possibly by multiple server tiers. A complete server response is sent back to the client process by the server process after processing of the client request is complete. The client process may begin receiving the server response before the complete server response has been sent by the server process. For example, the server response may involve the server process streaming content to the client process. Alternatively, the client process may not begin receiving the server response until after the complete response has been sent by the server process.

Application Transaction Segmentation

Some existing performance management solutions provide metrics on transaction processing time often referred to in these solutions as "response time" or "service response time". Such a metric is typically calculated by subtracting client request arrival time at the server process from the time the server process completes sending of the server response. However, such metrics provide only limited visibility into hosted tier performance. Such metrics may indicate that a particular application took an unexpectedly long time to process but not why it took so long to process the transaction.

In accordance with some embodiments, the performance management solution uses system events captured by OS agents and results of processing thereof to segment an application by activity or resource class. In addition, metrics indicating the segmentation are presented in the web dashboard in addition to or instead of conventional response time metrics.

Figure 8:
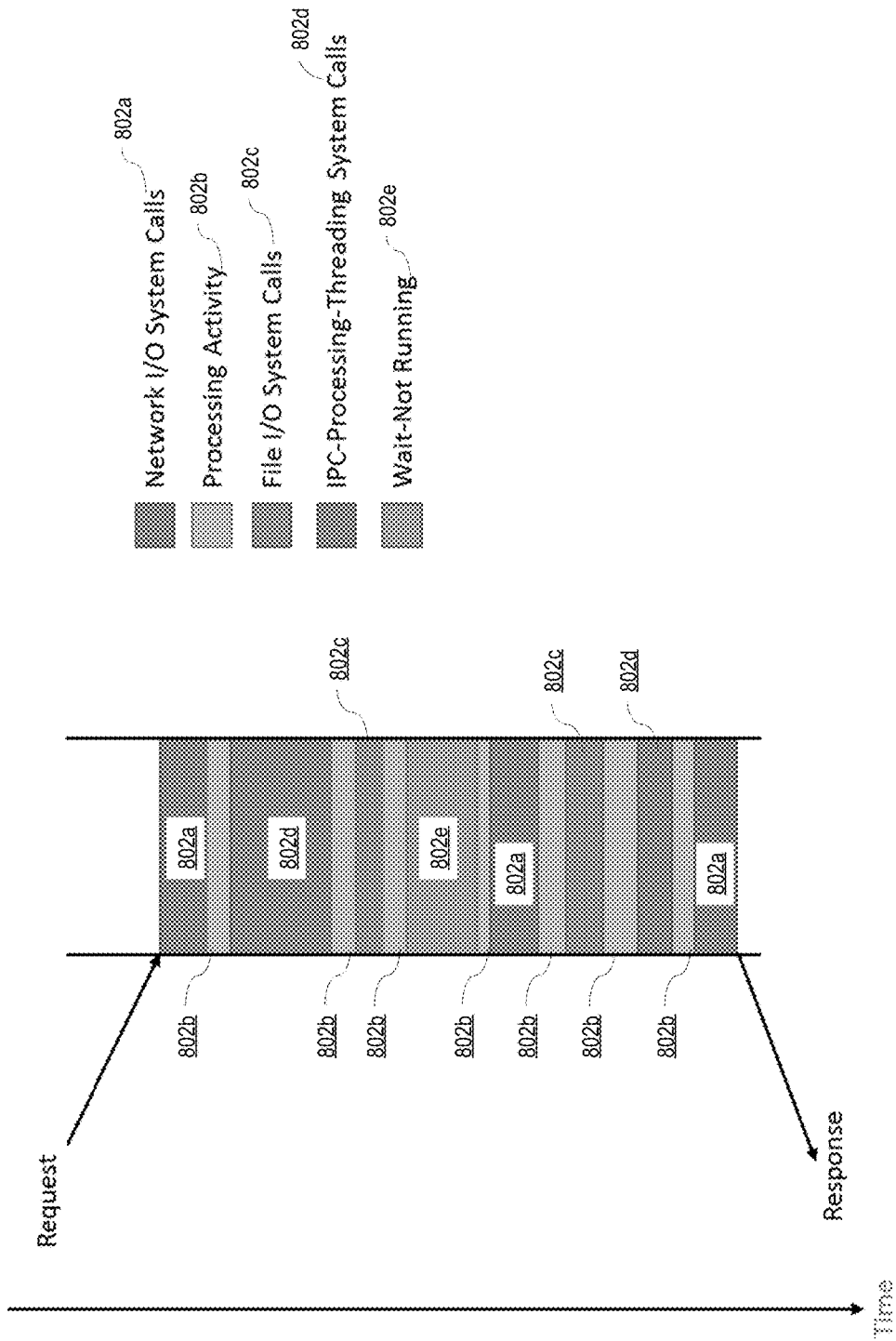
FIG. 8 illustrates segmentation of an application transaction by activity or resource class, in accordance with some embodiments.

FIG. 8 illustrates segmentation of an application transaction by activity or resource classes. In this example, there are five resource classes 802a through 802e that are determined based on the type of system calls made by an application component process processing the transaction. In this example, after the client request arrives, the process spends some time in a network I/O call 802a, for example, reading the client request data from a network communication endpoint (e.g., a socket).

Next, the process performs some processing activity 802b which may be defined as time between systems calls for the process.

Next, the process spends some time in inter-process communication processing and/or threading system calls 802d as so on until finally the process spends some more time in a network I/O call 802a, for example, writing the server response data to the network communication endpoint.

By segmenting an application transaction by activity or resource classes, it makes it possible to tell not only how much time was spent processing a particular application transaction, but also which server resources (e.g., disk, memory, network, CPU, etc.) the particular application transaction used. For example, by segmenting an application transaction by activity or resource classes based on the system events captured by the OS agents and results of processing the captured system events by the CAS engine, the web dashboard can indicate for the transaction, among other information, which files the transaction accessed, the time spent doing network I/O, the time spent doing disk I/O, the amount of bytes read from and written to disk, the aggregated disk I/O latency, the disk I/O latency per disk volume, directory, or file, etc. Aggregated metrics may also be presented such as total disk I/O by Uniform Resource Indicator (URI), disk I/O latency by file, CPU processing time by client network address, files accessed by a database query, etc.

Figure 9:
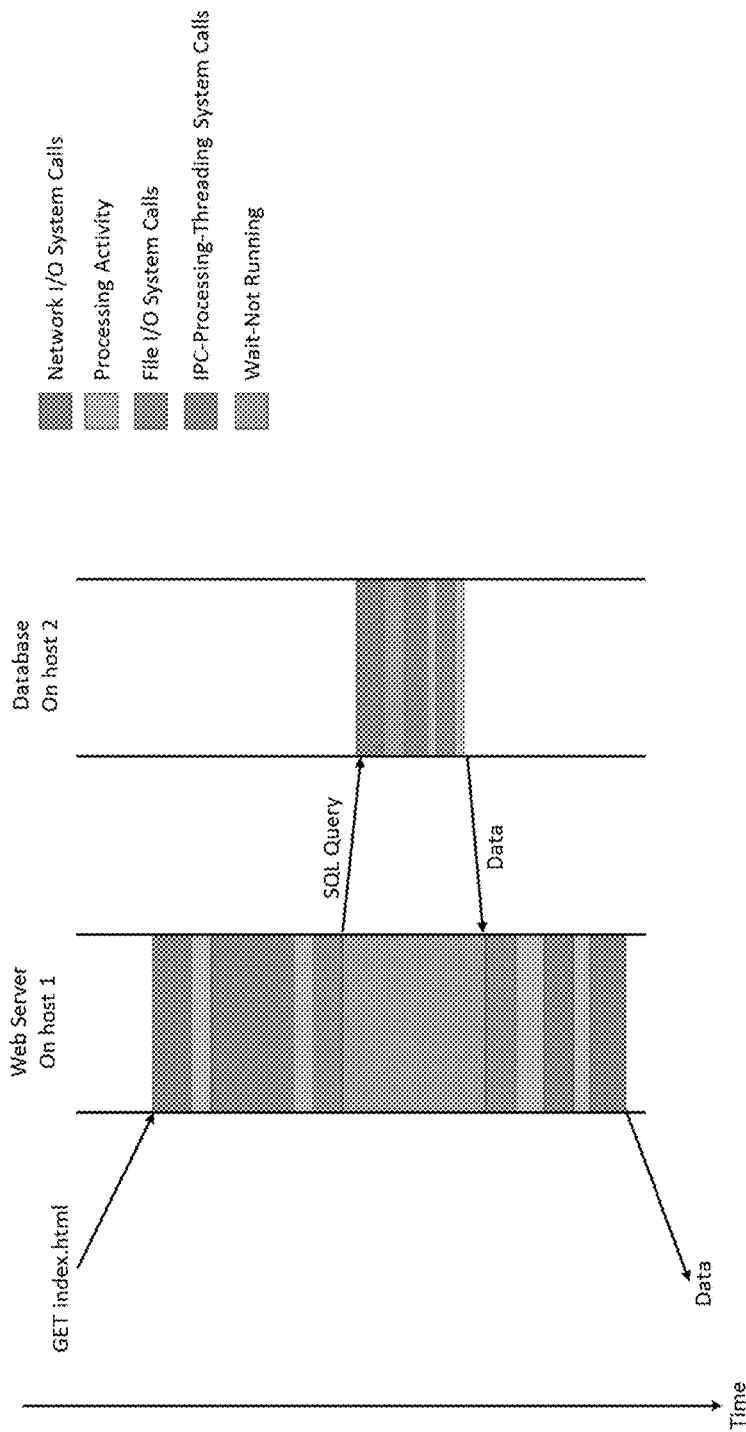
FIG. 9 illustrates segmentation of a multi-tier application transaction by activity or resource class, in accordance with some embodiments.

An application transaction that spans multiple server tiers can also be segmented. Segmentation can attribute which portions of transaction processing are attributable to which tiers. For example, FIG. 9 illustrates segmentation of a multi-tier transaction by activity or resource classes. Here, part of the resource usage of the transaction is attributed to a web server process on host 1 and another part of the transaction is attributed to a database server process on host 2.

The attribution of transaction processing by the web server process on host 1 and transaction processing by the database server process on host 2 to the same application transaction is possible because of contextual information associated with system events captured from the web server process on host 1 and the database server process on host 2. In particular, system events captured from the web server process on host 1 relating to network I/O system calls for sending the SQL query to the database server process on host 2 and for receiving data from the database server process in response to sending the SQL query can be associated with network communication endpoint information available from the captured system event data itself.

For example, a captured system event from the web server process pertaining to establishing a network connection (e.g., a TCP connection) to the database process may specify a local network address, a local network port, a peer network address, and a peer network port pertaining to the connection. This contextual information can also be associated with subsequently captured system events from the web server process by querying system state tables and/or operating system interfaces as described above.

Similarly, a captured system event from the database process pertaining to accepting the network connection from the web server process may also specify a local address, a local network port, a peer network address, and a peer network port pertaining to the connection. This contextual information can also be associated with subsequently captured system events from the database server process by querying system state tables and/or operating system interface as described above. The network communication endpoint information associated with the system events captured from the web server process and the database server process can be compared to each other to determine that applications events all pertain to the same network connection.

Web Dashboard

As mentioned, captured system events and results of processing system events are presented to a user by a web dashboard. The web dashboard may include one or more server computers configured with web server software for serving web pages for display in the user's web browser at his or her computing device. The web server software may operate on the same severs as the CAS engine or on different server computers. In either configuration, the web server software of the web dashboard is operatively coupled to the CAS engine. Generally, it is the function of the CAS engine to produce and store metric data based on captured system events for presentation by the web dashboard. The function of the web dashboard is to respond to user interface interaction and retrieve requested metric data from the CAS engine and present the metric data to the user in a useful way.

Application Component Process Map

In some embodiments, the web dashboard presents an application component process map to the user. The application component process map includes nodes. Each node represents an application component process. The nodes are connected by directed edges. The directed edges represent directional network communication flow.

Figure 10:
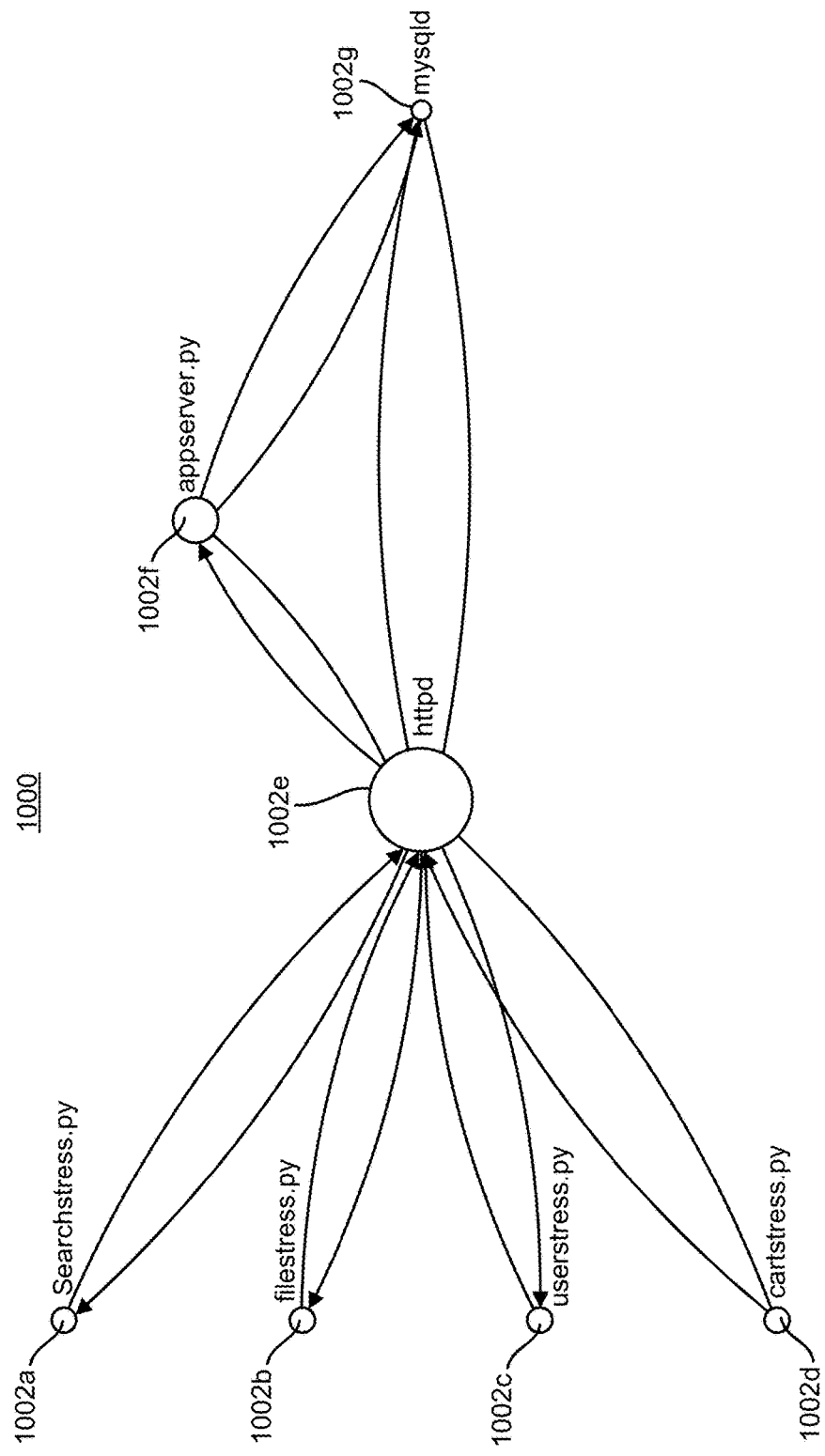
FIGS. 10-12 illustrate application component process maps displayed by a web dashboard, in accordance with some embodiments.

In some embodiments, the visual size of a node in the map represents a proportional amount of time the corresponding application component process spent performing a type of activity over the course of processing one or more application transactions. For example, FIG. 10 illustrates application component process map 1000 that may be presented to a user by the web dashboard. Map 1000 has a number of nodes 1002a through 1002g (generally, "node 1002). Each node 1002 represents an application component process from which system events have been captured using operating system instrumentation. Nodes 1002a through 1002d represent application component processes in the client tier. Nodes 1002e through 1002g represent application component processes in the hosted tier. Here, the size of the nodes 1002 in the map 1000 is proportional to the amount of time the corresponding application component processes spent processing the application transaction.

Figure 11:
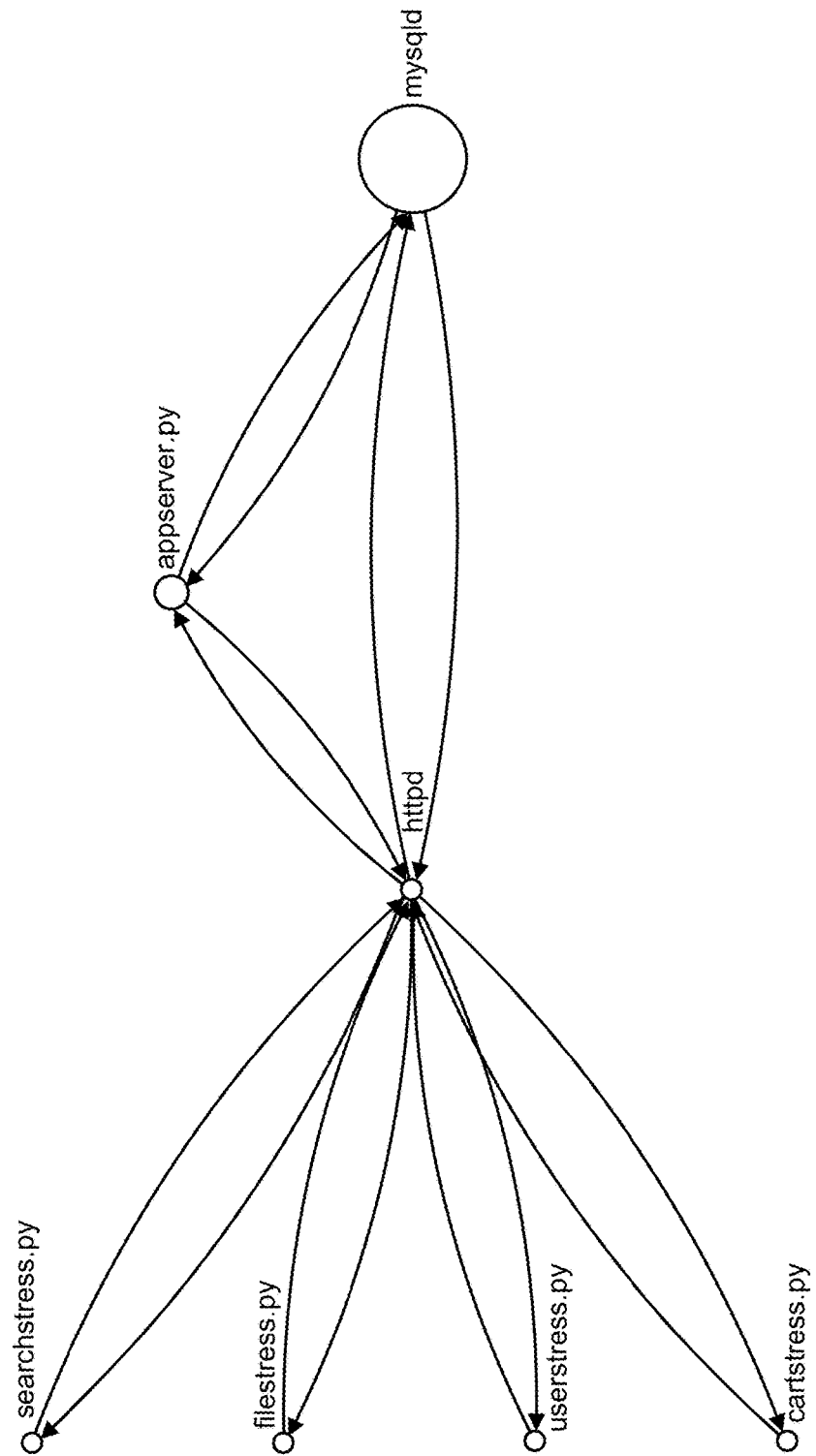

In FIG. 11, the visual size of the nodes 1002 of FIG. 10 have been changed in response to user input to the web dashboard to reflect the amount of data each application component process transfers on the network.

Figure 12:
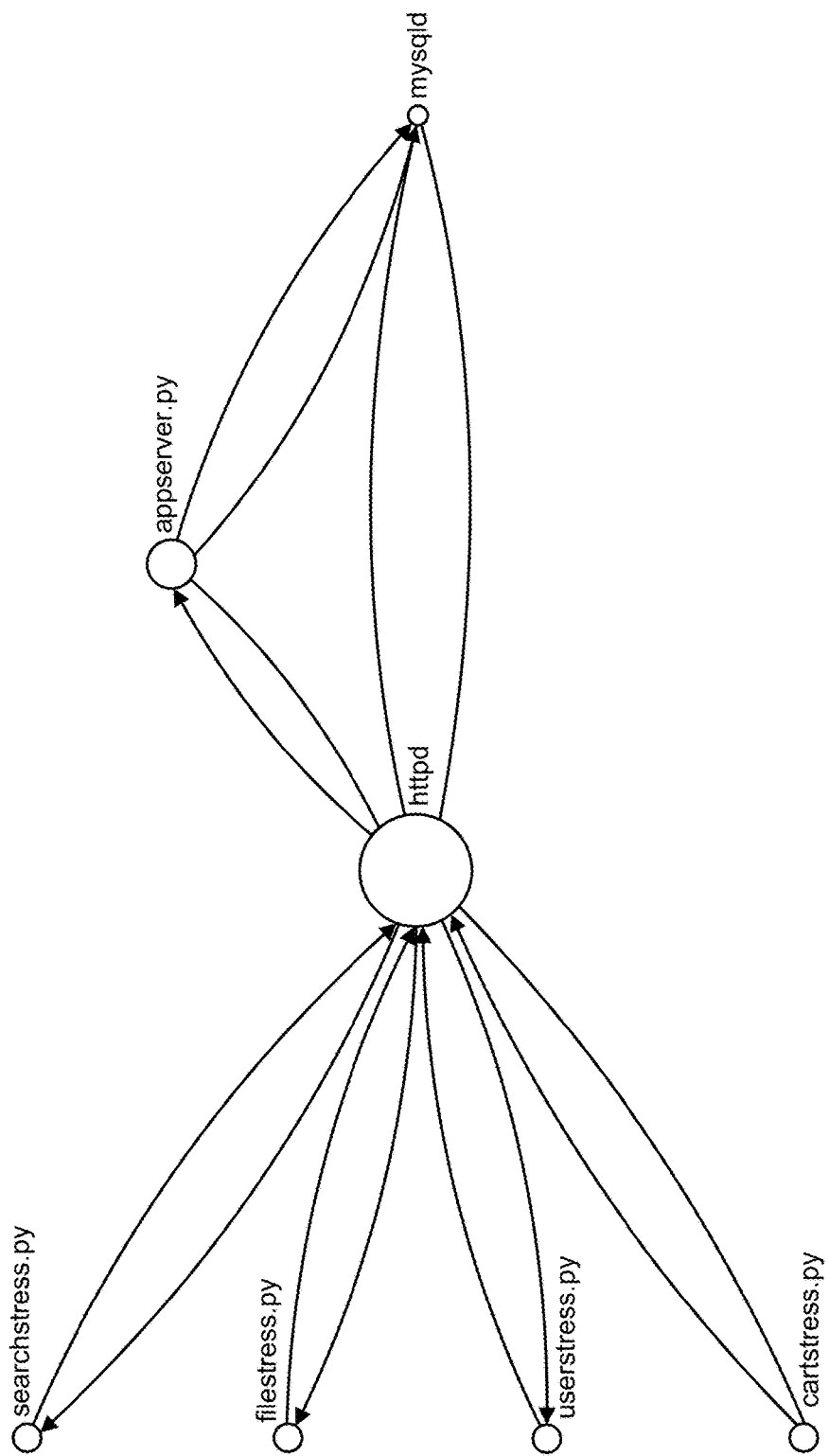

In FIG. 12, the visual size of the nodes 1002 of FIG. 100 have been changes in response to user input to the web dashboard to reflect the amount of file I/O performed by each application component process.

While in some embodiments, application component processes are represented as circles in the application component process map, application component processes are represented as other geometric shapes or with icons in other embodiments. For example, an application component process can be represented in the map with an icon that indicates the type of the corresponding application component process. The size and/or shape of the icon may be used to indicate an amount of time or an amount of resource usage pertaining to an activity class.

File System Access Map

In some embodiments, the web dashboard presents a file system access map to the user. The file system access map indicates files accessed by application component processes on hosts. In some embodiments, the file system access map is an area graph in which the entire area of the graph represents all file system activity during the application transactions and subsets of the entire area represent a portion of all file system activity pertaining to a file system directory or file. The area graph may be hierarchical to reflect the hierarchical nature of the file system.

Figure 13:
FIGS. 13-15 illustrate file system access maps displayed by a web dashboard, in accordance with some embodiments.

For example, FIG. 13 illustrates file system access map 1300 that may be presented to a user by the web dashboard. Map 1300 is in the shape of a rectangle. The area of the map 1300 is divided into sub-rectangles. More or fewer levels of sub-rectangles are also possible. Each sub-rectangle corresponds to a file system directory or file accessed during processing of application transactions by application component processes. The area of the sub-rectangle represents the amount of data read from and written to the corresponding directory or file during application transaction processing.

In map 1300, some sub-rectangles are nested within other larger sub-rectangles reflecting the hierarchical nature of the file system. The larger sub-rectangle reflects file system activity within a "parent" directory and the nested sub-rectangle reflects file system activity within a sub-directory of the parent directory or file in the parent directory. For example, sub-rectangle 1302, highlighted in bold in FIG. 13 for illustrative purposes, represents file system activity in the parent directory "/usr/lib/python/2.7/". Nested sub-rectangle 1304, also highlighted in bold in FIG. 13 for illustrative purposes, represents file system activity within a sub-directory of "/usr/lib/python/2.7/".

Sub-rectangles representing the top level of directories and files of the file system access map can be visually distinguished in the file system access map using different fill colors. For example, sub-rectangle 1302 including all nested sub-rectangles thereof (e.g., sub-rectangle 1304) representing file system activity within the directory "/usr/lib/python/2.7/" may be colored dark green while sub-rectangle 1306 representing file system activity within the directory "/usr/include/python/2.7/" may be colored light green. In this way, the viewer can easily see that much more file system activity took place in the "/usr/lib/python/2.7/" directory than the "/usr/include/python/2.7/" directory while at the same time providing in indication through nested sub-rectangles of sub-rectangle 1302 of the distribution of file system activity within "/usr/lib/python/2.7/".

From the file system access map, a viewer can quickly determine which files and directories were accessed most. For example, from map 1300, the viewer can see that a significant amount of file system activity took place within the "/usr/include/python/2.7/" directory.

Figure 14:
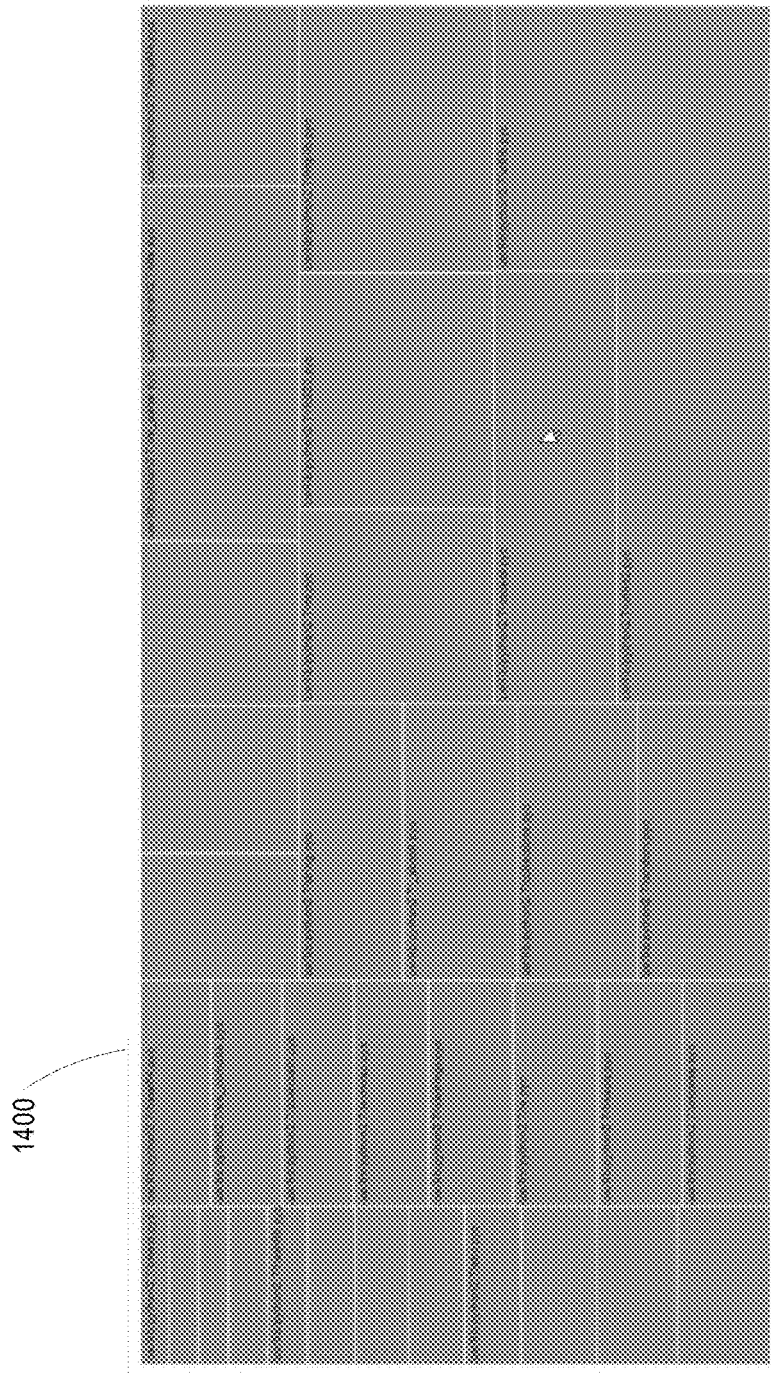

The file system access map may be interactive to allow the user to drill-down into file system access details. In response to selection of sub-rectangle of the top-level file system access map by user input (e.g., by mouse input or touch gesture on a touch sensitive display), a drill-down file system access map maybe generated and displayed to the user by the web dashboard. For example, FIG. 14 illustrates a drill-down file system access map 1400 displayed by the web dashboard in response to selection of sub-rectangle 1302 of map 1300. Drill-down file system access map 1400 indicates that most of the file system access within the directory "/usr/include/python/2.7/" pertains to loading python library files. A devop can review the drill-down map 1400 to see if any python libraries unnecessary for processing the application transactions are being loaded. The develop may then edit the python application source files accordingly to ensure any unnecessary python library files are not loaded, thereby reducing the amount of file system access to directory "/usr/include/python/2.7/" needed to process the application transactions.

The sizes of sub-rectangles in maps 1300 and 1400 represent the amount of data read from and written to various file system directories and files during application transaction processing. In some embodiments, the size of a sub-rectangle in a file system access map represents the amount of time spent reading and writing data to and from the corresponding directory or file. For example, from map 1300 a user can see that about half of the total amount of data read from and written to file systems involved the "/usr/include/python/2.7/" directory.

Figure 15:
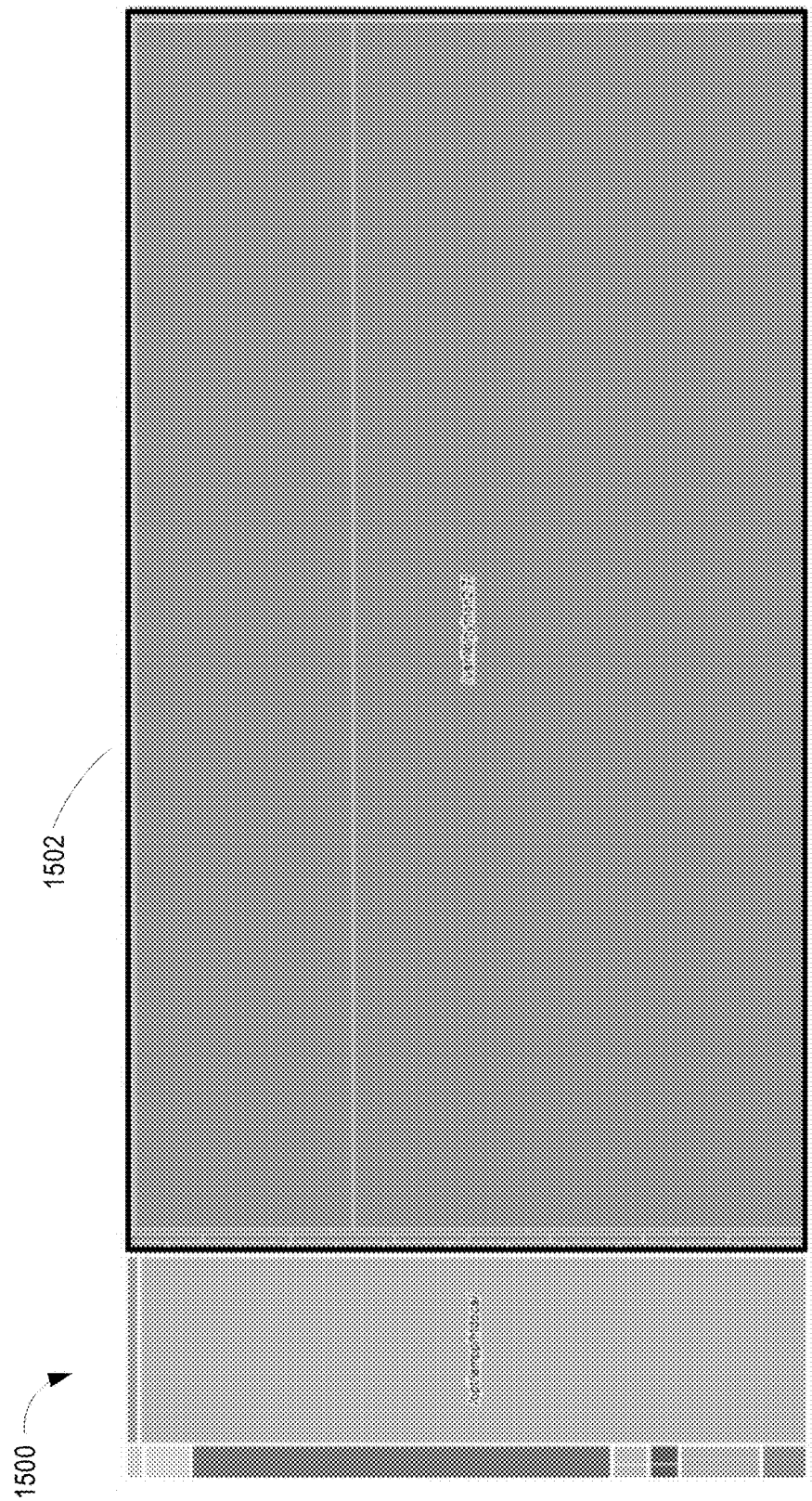

Map 1500 of FIG. 15 organizes file system access by time spent reading data to and from various directories and files. From map 1500, a user can see from the area of the entire map 1500 that rectangle 1502 covers that significantly more than half the file system access time involves reading data from and writing data to the "/usr/include/python/2.7/" directory. Accordingly, the user may decide that a caching solution for caching python library files stored in the "/usr/include/python/2.7/" directory is warranted to speed up file system access time for the application transactions.

Hosted-Tier Resource Usage by Client Type

Figure 16:
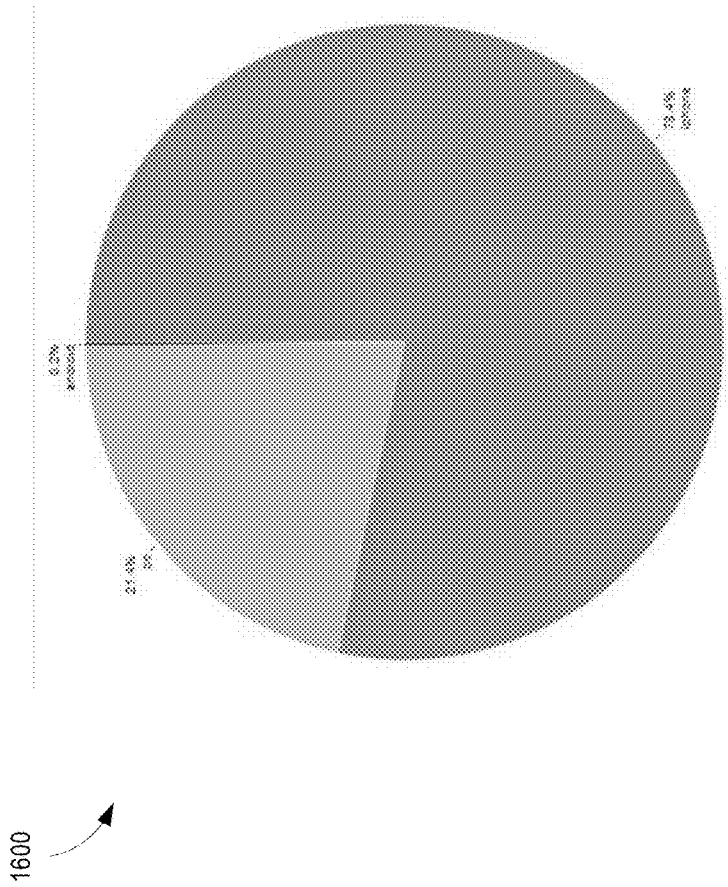
FIG. 16 illustrates a pie chart showing hosted tier resource usage by client type and displayed by a web dashboard, in accordance with some embodiments.

In an embodiment, hosted infrastructure resource usage is displayed by client type. Client type information for application requests may be captured by operating system instrumentation on web servers from HTTP or HTTPS requests from clients arriving at the web servers. For example, the web dashboard can present a visualization to the user indicating which client platform is using the most of a hosted tier resource. For example, FIG. 16 illustrates a pie chart 1600 that may be presented to a user by the web dashboard. In this example, pie chart 1600 shows that the iPhone client platform causes the most disk I/O in the hosted tier with its application requests.

Hosted-Tier Resource Usage by Application Transaction URLs

Figure 17:
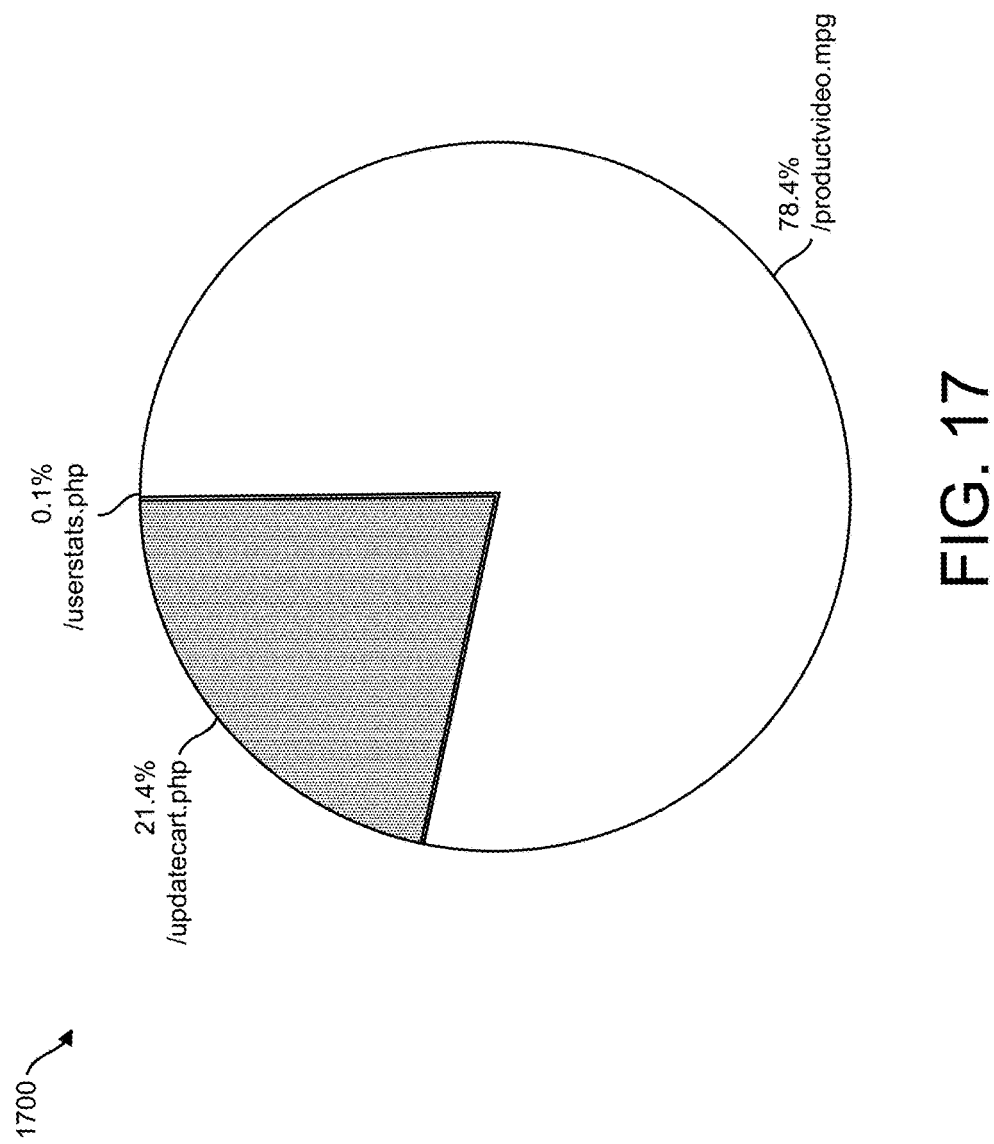
FIG. 17 illustrates a pie chart showing hosted tier resource usage by application uniform resource locators and displayed by the web dashboard, in accordance with some embodiments.

In some embodiments, the web dashboard allows a user to view which application transaction URLs consume the most resources of the hosted tier. For example, FIG. 17 illustrates a pie chart 1700 that may be presented to a user by the web dashboard. The chart 1700 indicates disk I/O for application transactions at three different URLs of the application. As can be seen from the chart 1700, of the application transactions for the three different URLs, the application transactions for the URL "/productvideo.mpg" results in the most disk I/O in the hosted tier. This might be expected, for example, if application transactions for the URL "/productvideo.mpg" involve streaming video data from disk storage in the hosted tier to client devices. Resource usage other the disk I/O may be conveyed such as network I/O usage and CPU usage.

Captured System Events for a Single Application Transaction

Figure 18:
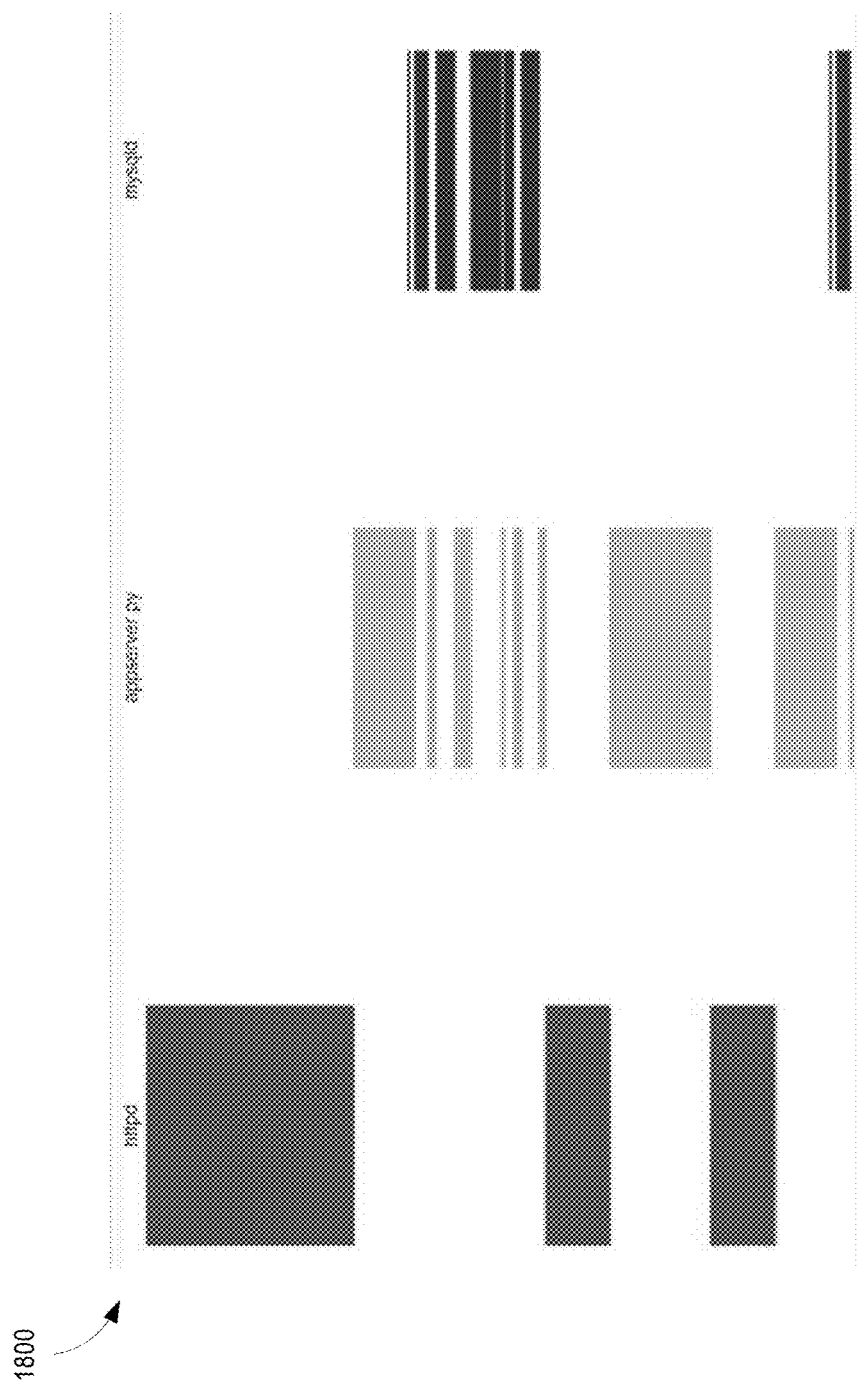
FIG. 18 illustrates a timeline view of an application transaction displayed by a web dashboard, in accordance with some embodiments.

In some embodiments, the web dashboard is configured to allow a user to browse the system events captured from multiple application component processes that process a single application transaction. For example, FIG. 18 illustrates a timeline view 1800 of a single application transaction that may be presented to a user by the web dashboard. The timeline view 1800 organizes the system events captured from the application component processes that process the application transaction in columns, one column per application component process. Within a column are blocks representing a sequence of captured system events. Gaps between blocks in a column represent periods of time when the respective application component process was blocked (e.g., waiting for I/O) or not running. For the timeline view 1800, a user can acquire a clear picture on how the application component processes depend on each other to process the application transaction.

Figure 19:
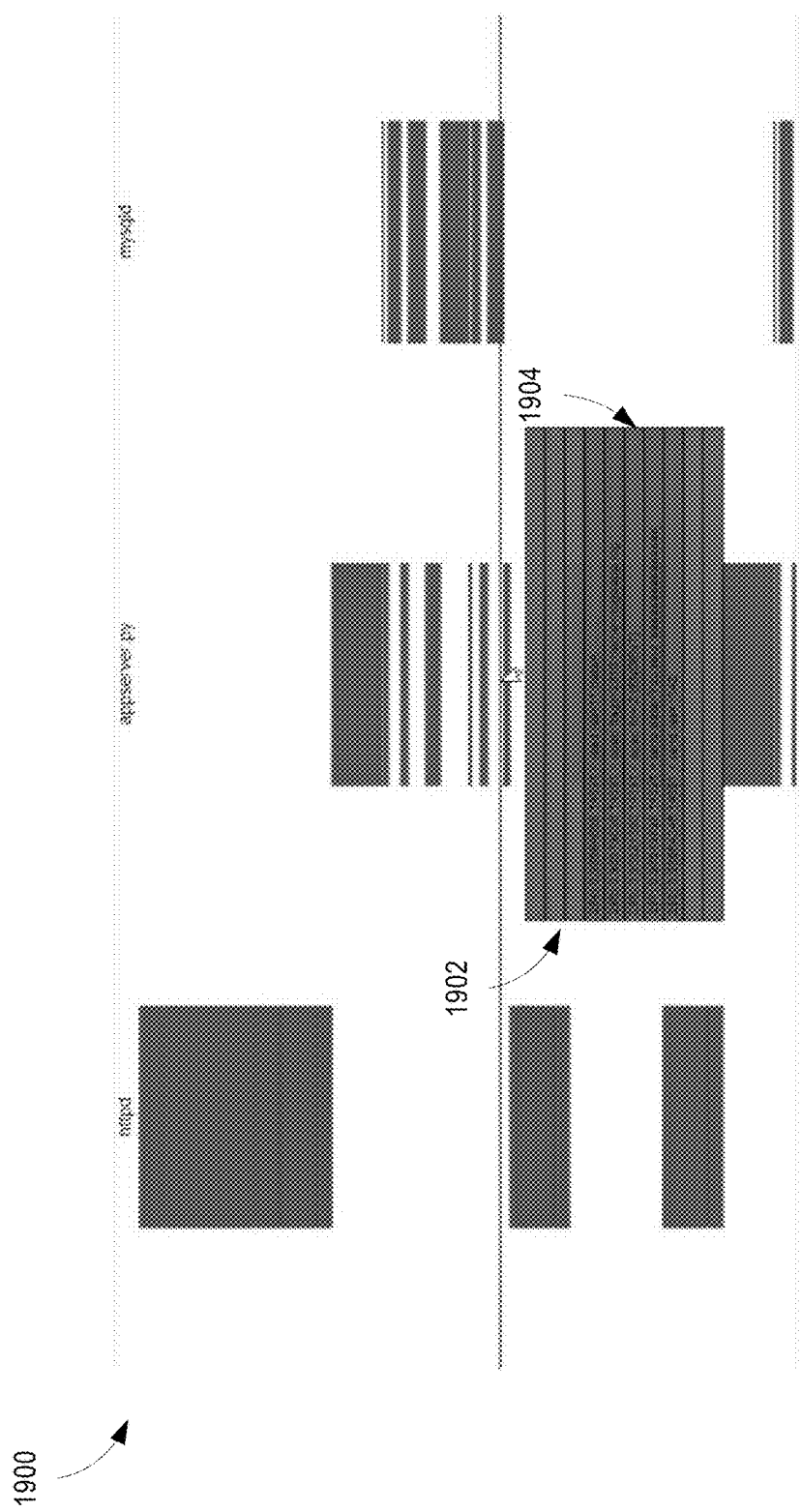
FIG. 19 illustrates a timeline view of an application transaction displayed by a web dashboard, in accordance with some embodiments.

In some embodiments, the user can direct input to a block of system events in a column of the timeline view to view the individual system events that make up that block. For example, the user may mouse over the block with a pointing device or use a touch gesture on the block if displayed on a touch-sensitive display. For example, as shown in FIG. 19, the user has directed the mouse over a block in the column for the appserver.py application component process. In response, the web dashboard presents an overlay window 902 listing the captured system events that make up the selected block in order of capture. One of the captured system event listings 1904 is highlighted in red to indicate that the corresponding system call returned an error. Other blocks have visual indicators to indicate where a system call returned an error. For example, the first block in the column for the httpd application component process has red horizontal lines to indicate captured system calls that returned an error. The user can direct input to the block to discover the details of those errors.

Web Dashboard User Interfaces

FIG. 20, FIG. 21, FIG. 22, FIG. 23, FIG. 24 illustrate examples of web pages that may be presented to a user by the web dashboard based on system events collected and processed by the CAS engine.

Figure 20:
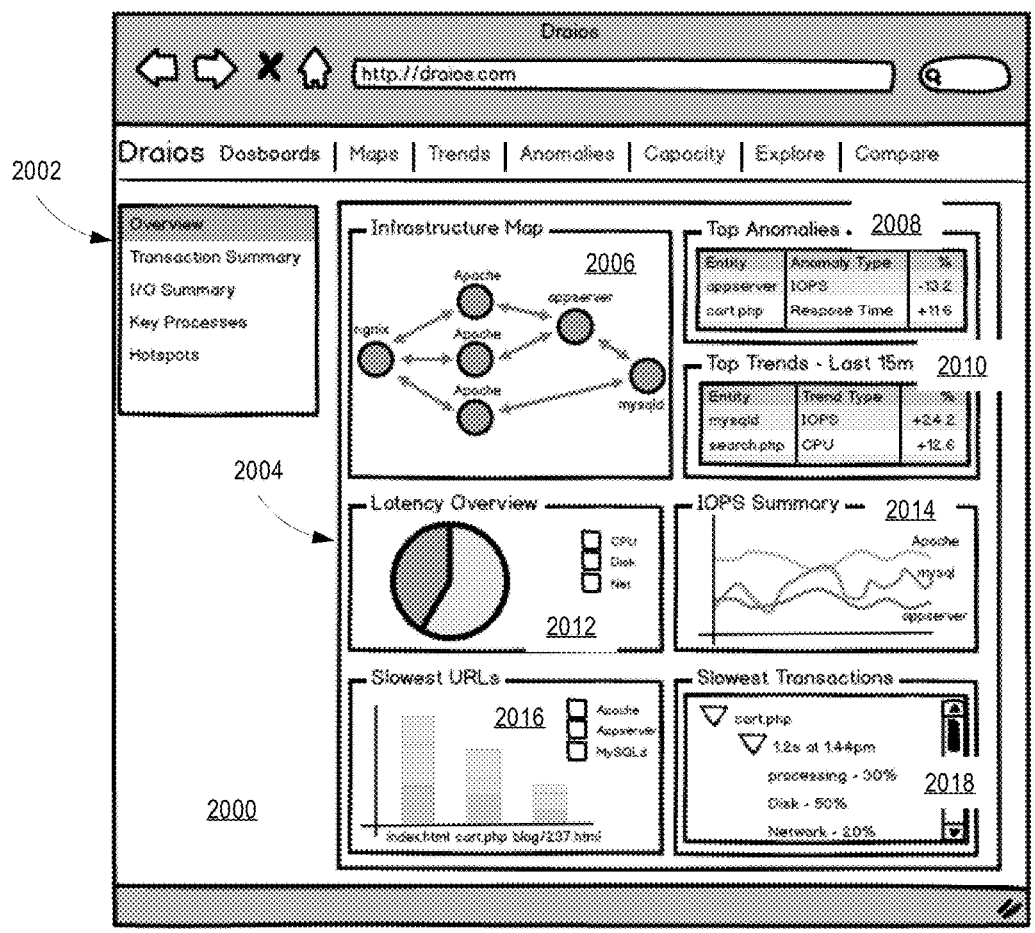
FIG. 20, FIG. 21, FIG. 22, FIG. 23, FIG. 24 illustrate examples of web pages that may be presented to a user by a web dashboard, in accordance with some embodiments.

FIG. 20 shows a web page 2000 presenting one of multiple user-selectable dashboards in the dashboard selection box 2002. Web page 2000 presents the overview dashboard 2004, which is currently selected as indicated with highlighting in the dashboard selection box 2002.

The overview dashboard 2004 includes an infrastructure map widget 2006. Infrastructure map widget 2006 presents, as an application component process map, the infrastructure of an application as it is composed of application component processes executing on hosts.

Overview dashboard 2004 also includes an anomalies widget 2008 showing metrics that deviate substantially from a baseline, for example, an unusually low number of input/output operations per second (IOPS) for an application server component process or an unusually high response time for an application URL.

Trends widget 2010 shows recently trending metrics. For example, the CPU required by the hosted tier to process the "search.php" URL has increased in the last fifteen minutes.

Latency overview widget 2012 shows the average latency application component processes add to application transaction processing and how much of the latency is attributable to CPU, disk I/O, or network data transfer.

IOPS Summary widget 2014 shows the disk I/O for application component processes involved in processing application transactions. In some embodiments, metrics for multiple application component process for the same application component are consolidated into a single metric representing all the application component process for presentation by the web dashboard. For example, the graph of Apache in the TOPS Summary Widget 2014 may represent an average IOPS summary across three Apache web server application component processes.

Slowest URLs widget 2016 shows how much time is spent by different server tiers processing the slowest processed application transaction URLs. Here, because of the operating system instrumentation, the slowest URLs widget 2016 can show not only which URLs are the slowest but how much time is spent processing the slowest URLs in different tiers. For example, slowest URLs widget 2016 can show how much time the database tier takes to process the slowest URLs which can be compared to how much time the application server tier is taking to process the same URLs.

Slowest transactions widget 2018 shows the slowest single application transaction that the hosted tier processed including the URL of the application transaction and time spent processing the transaction across different activity classes and different server tiers.

Figure 21:
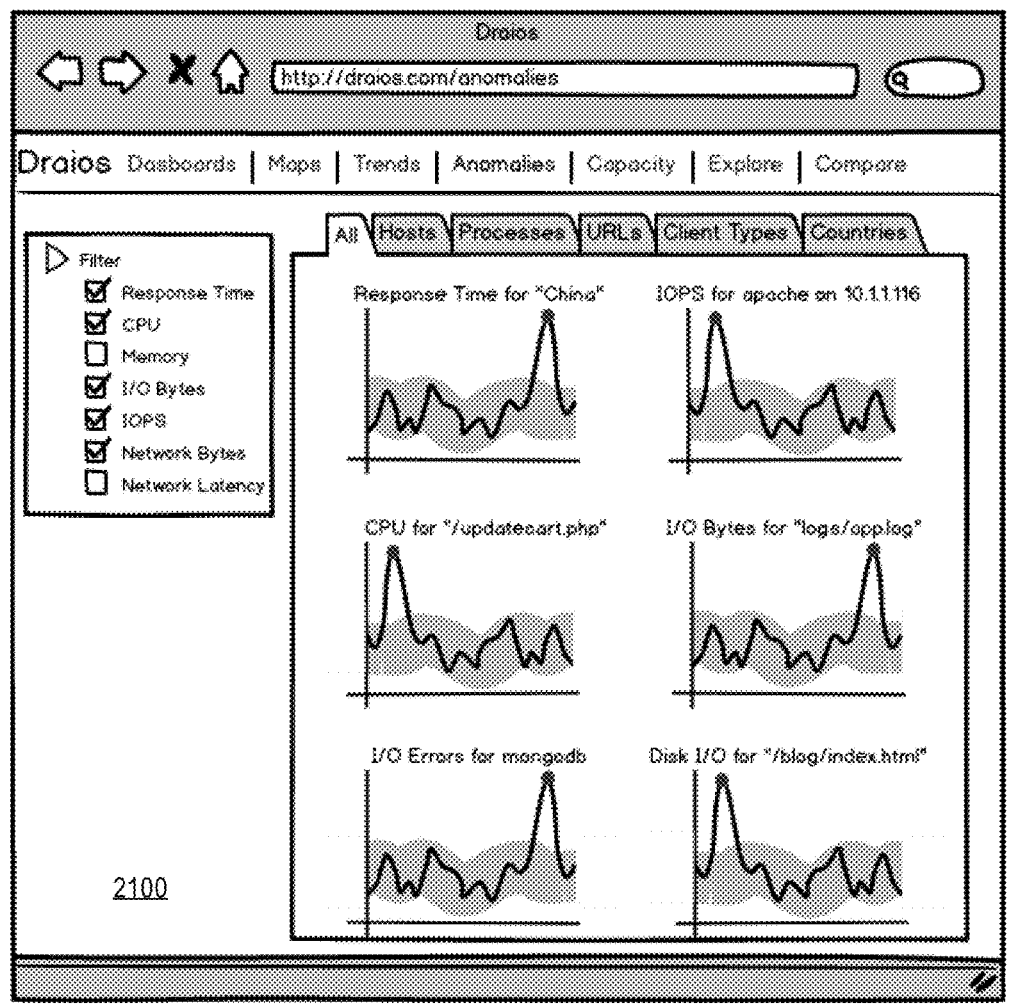

FIG. 21 illustrates an anomalies web page 2100 that may be presented to a user by the web dashboard. Anomalies may be detected by base-lining key metrics and detecting when the metrics deviate usually from the baseline. Different metrics can be baselined including response time for a subset of users, disk performance or I/O errors for selected application component processes, and CPU usage for selected application URL, as just some examples.

Figure 22:
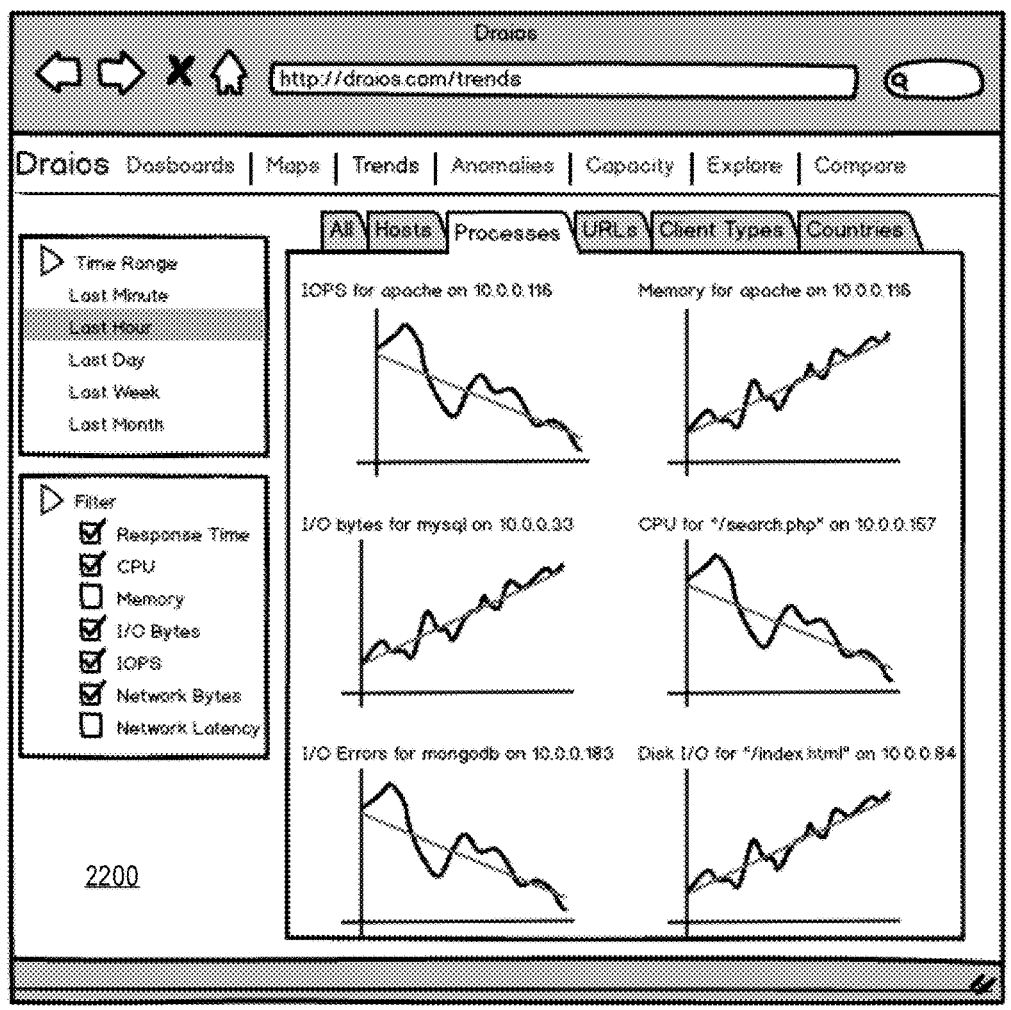

FIG. 22 illustrates a trends web page 2202 that may be presented to a user by the web dashboard. Trends provide context and highlight dangerous tendencies of an application. For example, a devop may receive notification from a user of an application that the application is responding slowly for the perspective of the user. Trends web page 2202 present metrics of the application that have recently grown or shrunk in a steady or remarkable way. Trends can be observed in the trends web page 2202 at different time ranges. Shorter time ranges, for example, on the order of minutes or hours, are useful for identifying recent storage issue or memory leaks. Longer time ranges, for example on the order of weeks or months, are useful for identifying application bottlenecks or capacity hotspots.

Figure 23:
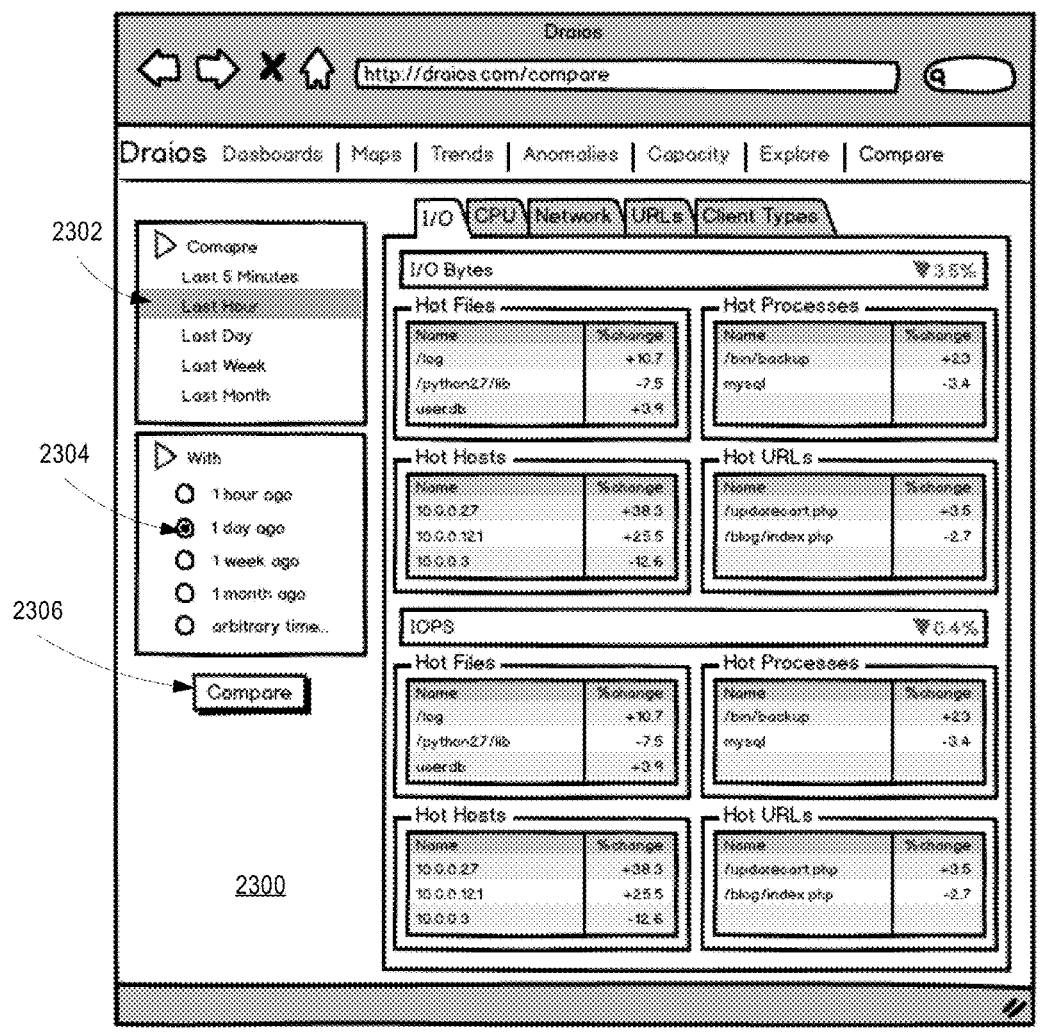

In some embodiments, the web dashboard provides a compare feature. For example, a devop may use the compare feature after upgrading the application software or changing the application configuration. After the upgrade or change, the devop might be curious to understand the impact of the upgrade or change on application performance. The compare feature of the web dashboard accepts two periods of time as input to compare. The result of the compare operation can include displaying to the user metrics that have significantly changed between the two periods of time. For example, FIG. 23 illustrates a web page 2300 generated by the compare feature of the web dashboard. Web page 2300 is generated in response to specifying two periods of time to compare. For example, web page 2300 may be generated in response to making a source time period selection 2302, a target time period selection 2304, and activating the compare button 2306. In this example, the source time period is the last hour and the target time period is the same hour on the previous day. In response, web page 2300 shows that disk I/O throughput for the application component process has decreased by 0.4%. Web page 2330 also shows problem files, processes, hosts, and ULs.

Figure 24:
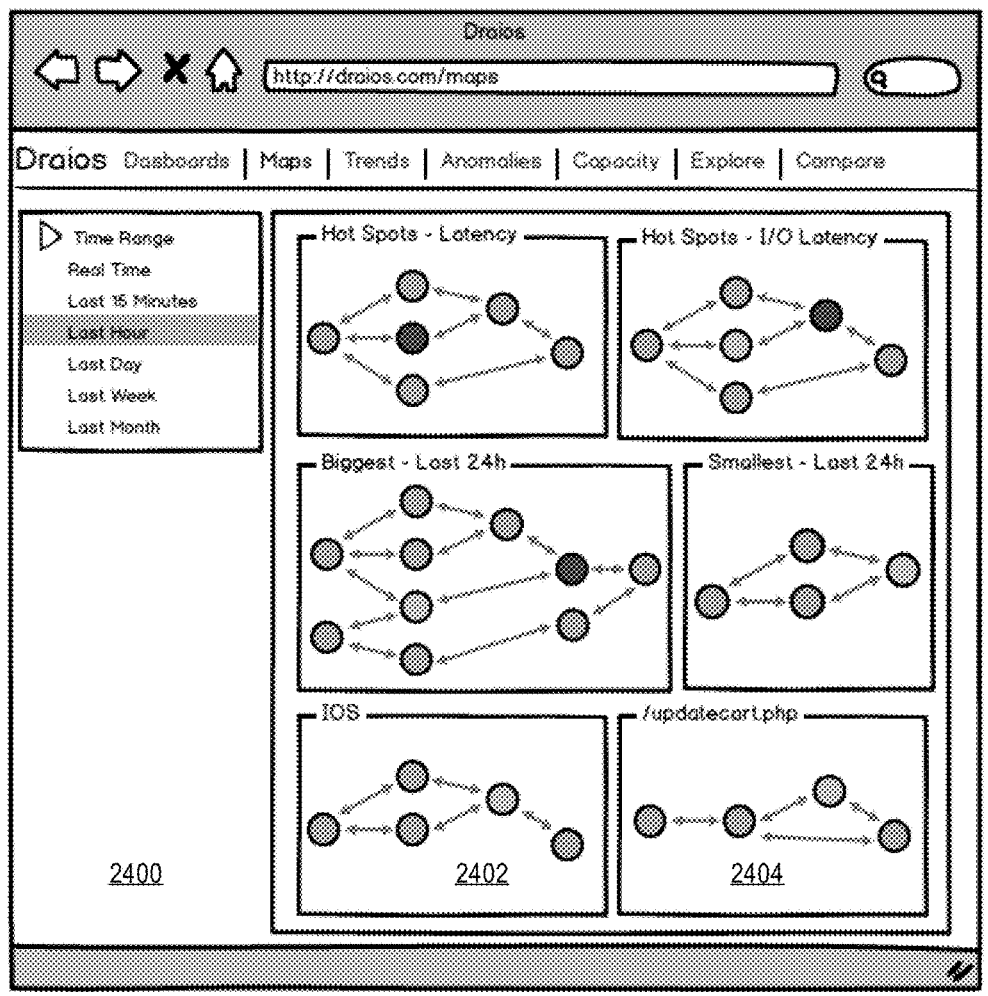

In some embodiments, the web dashboard presents a maps web page to the user. For example, FIG. 24 illustrates maps web page 2400 that may be presented to a user by the web dashboard. Maps web page 2400 allows the user to visualize the application layout from different useful perspectives. For example, the user can view maps web page 2400 to identify latency or processing bottlenecks. Maps web page 2400 also indicates the application infrastructure at its peak load and at its lightest load in the past hour. The maps web page may also present maps of a subset of the application infrastructure. For example, maps web page 2400 presents a subset map 2402 of the application infrastructure involved in serving IOS client devices and another subset map 2404 of the application infrastructure involved in serving a URL.

Security

In some embodiments, the application management solution is used to store system events for purposes of reconstructing hacker attacks, user activity, virus attacks, or other security vulnerabilities of an application. Additional context can be created around the captured system events and analytic tasks can be performed by the CAS engine on the stored system events including tracking the sequence of steps involved in a hacker penetration of the application or a virus attack. Such tracking may include, but is not limited to, tracking:
   network data and file exchange,
   creation or removal of processes,
   file creation, removal, and access,
   library loading,
   changing of access privileges,
   user impersonation, and
   modifications to the kernel.

Other tasks that may be performed include tracking user activity. Such tracking may include, but is not limited to, tracking:
   list of executed commands,
   accessed files, directories, and volumes,
   change of system settings,
   network data and file exchange, and
   unauthorized data export.

In some embodiments, captured system events are presented in a three-pane window configuration in the web dashboard. One pane lists captured system events in chronological order.

Example Implementing Mechanism

Figure 25:
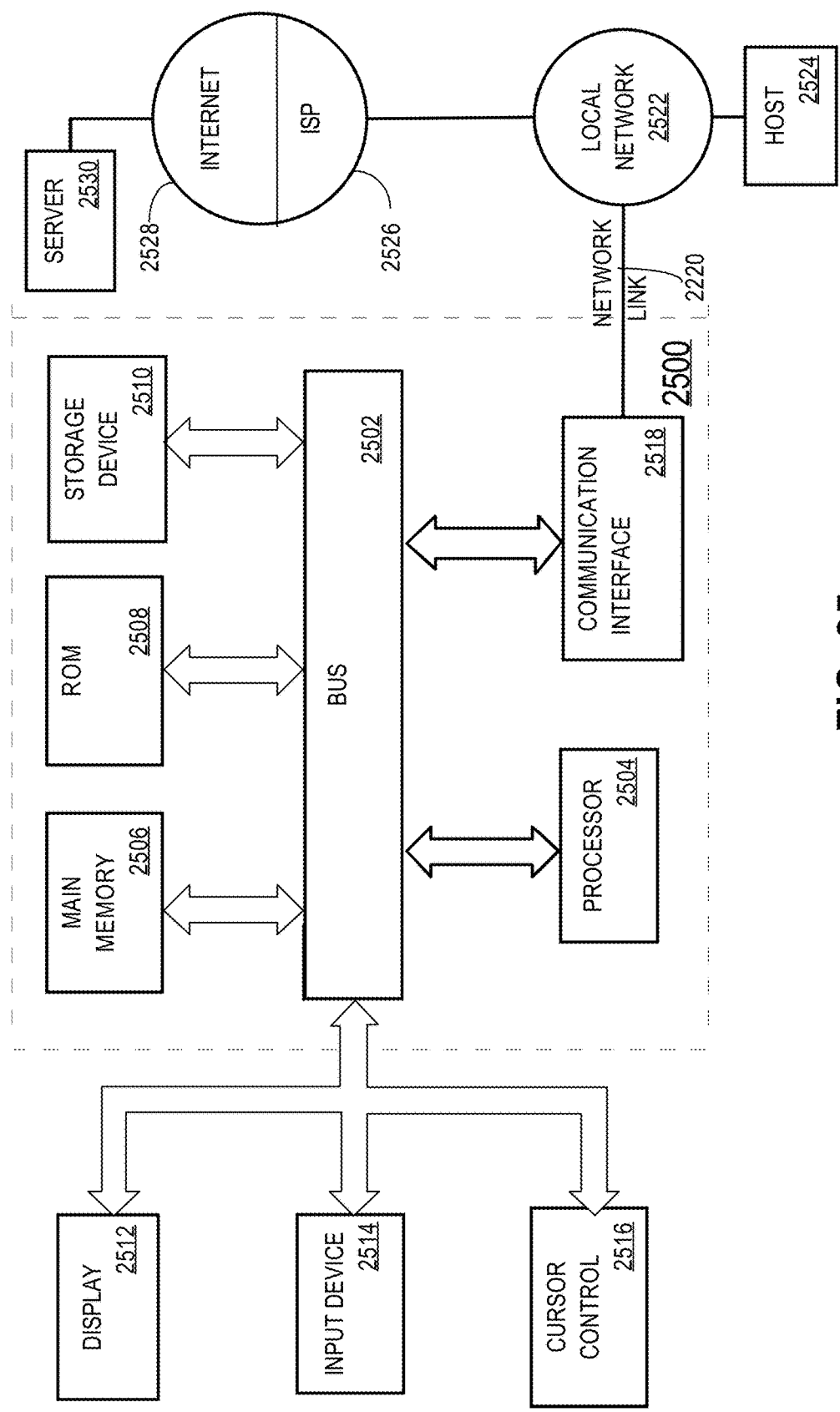
FIG. 25 is a block diagram that illustrates a computer system with which some embodiments of the present invention can be implemented.

FIG. 25 is a block diagram that illustrates a computer system 2500 with which embodiments of the present invention can be implemented. Computer system 2500 includes bus 2502 or other communication mechanism for communicating information and hardware processor (CPU) 2504 coupled with bus 2502 for processing information. Bus 2502 collectively represents all system, peripheral, and chipset buses that communicatively connect the numerous components of computer system 2500. Hardware processor 2504 may be one or more general purpose microprocessors or a multi-core processor in different implementations.

Computer system 2500 also includes memory 2506, such as a random-access memory (RAM) or other dynamic storage device, coupled to bus 2502 for storing information and instructions to be executed by processor 2504. Memory 2506 also may be used for storing temporary variables or other intermediate information during execution of instructions to be executed by processor 2504. Such instructions, when stored in non-transitory storage media accessible to processor 2504, render computer system 2500 into a special-purpose machine that is customized to perform the operations specified in the instructions.

Computer system 2500 further includes a read only memory (ROM) 2508 or other static storage device coupled to bus 2502 for storing static information and instructions for processor 2504.

Storage device 2510, such as a solid state drive, a magnetic disk, or an optical drive, is provided and coupled to bus 2502 for storing information and instructions.

Computer system 2500 can be coupled via bus 2502 to display 2512, such as a liquid crystal display (LCD), for displaying information to a computer user.

One or more physical input devices 2514, for example an alphanumeric keyboard or other keyboard or keypad, can be coupled to bus 2502 for communicating information and command selections to processor 2504. Another possible type of input device 2514 is a cursor control, such as a mouse, a trackball, or cursor direction keys for communicating direction information and command selections to processor 2504 and for controlling cursor movement on display 2512. This input device typically has two degrees of freedom in two axes, a first axis (e.g., x) and a second axis (e.g., y), that allows the device to specify positions in a plane. Yet another possible type of input device 2514 is a touch-sensitive surface, such as one that overlays display 2512 to form a touch-screen display, for communicating direction and other information and command selections to processor 2504. The touch-sensitive surface typically has a sensor or set of sensors that accepts input from a user based on haptic and/or tactile contact.

One or more audio output devices 2516, for example headphones and/or audio speakers, can be coupled to bus 2502 for outputting audible information to a computer user.

Network interface 2518 provides a two-way data communication establishing a network link 2520 to a local network 2522. Network link 2520 may be wired (e.g., an Ethernet wire link) or wireless (e.g., a cellular wireless link or Wi-Fi wireless link). Local network 2522 can be a local Area network (LAN), a wide area network (WAN), or other network that is communicatively coupled to the Internet 2524 or one or more other data networks for communicating with one or more other computing devices 2526 that are also linked to the Internet 2524, local network 2522, and/or the one or more other data networks.

Computer system 2500 can send messages and receive data, including program code, through the network(s) 2522 and/or 2526, network link 2520 and network interface 2518. For example, a server 2526 might transmit requested code for an application program through the Internet 2524, local network 2522 and network interface 2518. The received code may be executed by processor 2504 as it is received, and/or stored in storage device 2510, or other non-volatile storage for later execution.

Computer system 2500 may implement the techniques described herein using customized hard-wired logic, one or more application specific integrated circuits (ASICs) or filed programmable arrays (FPGAs), firmware and/or program logic which in combination with the computer system causes or programs computer system 2500 to be a special-purpose machine.

According to one embodiment, the techniques herein are performed by computer system 2500 in response to processor 2504 executing one or more sequences of one or more instructions contained in main memory 2506. Such instructions may be read into memory 2506 from another storage medium, such as storage device 2510. Execution of the sequences of instructions contained in memory 2506 causes processor 2504 to perform the process steps described herein.

In alternative embodiments, hard-wired circuitry may be used in place of or in combination with software instructions.

Usage of Terms and Glossary

As used in the description of the invention and the appended claims, the terms "first", "second", etc. may be used herein to describe various elements, these elements should not be limited by these terms. These terms are only used to distinguish one element from another. For example, a first device could be termed a second device, and, similarly, a second device could be termed a first device, without departing from the scope of the present invention. The first device and the second device are both devices, but they are not the same device.

The singular forms "a", "an" and "the" are intended to include the plural forms as well, unless the context clearly indicates otherwise.

It will also be understood that the term "and/or" as used in the description refers to and encompasses any and all possible combinations of one or more of the associated listed items.

It will be further understood that the terms "includes," "including," "comprises," and/or "comprising" specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The term "non-transitory media" as used herein refers to any media that store data and/or instructions that cause a machine to operation in a specific fashion. Such non-transitory media may comprise non-volatile media and/or volatile media. Non-volatile media includes, for example, solid state devices, optical drives, and magnetic disks, such as storage device 2510. Volatile media includes dynamic memory, such as memory 2506. Common forms of non-transitory media include, for example, floppy disks, flexible disks, hard disks, solid state drives, magnetic tape, CD-ROMs, flash drives, or any other electronic, magnetic, or optical data storage media, and a RAM, a PROM, an EPROM, a FLASH-EPROM, a NVRAM, or any other memory chip or cartridge. Non-transitory media is distinct from but may be used in conjunction with transmission media. Transmission media participates in transferring information between non-transitory media. For example, transmission media includes coaxial cables, copper wire and fiber optics, including the wires that comprise bus 2502. Transmission media can also take the form of acoustic or light waves, such as those generated during radio-wave and infra-red data communications.

In this description, the terms "software" and "program" is meant to include firmware, applications, and/or sets of instructions stored in memory, for example memory 2506 and/or storage device 2510, which can be executed by one or more processors, for example processor 2504. In some embodiments, multiple software aspects may be implemented as sub-parts of a larger program while remaining distinct software aspects. In some embodiments, multiple software aspects can be implemented as separate programs. Finally, any combination of separate programs that together implement a software aspect described herein is within the scope of the disclosure. In some embodiments, the software programs, when installed to operate on one or more computing devices, define one or more specific machine implementations that execute and perform the operations of the software programs. A software program (also known as a program, software application (or just application), script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program can correspond to a file in a file system. A program can be stored in a portion of a file that holds other programs or data (e.g., one or more scripts stored in a markup language document), in a single file dedicated to the program in question, or multiple coordinate files (e.g., files that store one or more modules, sub-programs, or portions of code). A computer program can be deployed to execute on one computer or on multiple computers that are located at one site or distributed across multiple sites and interconnected by a communication network.

The combination of a program (e.g., an application program) being executed on an operating system and associated bookkeeping information used by the operating system is referred to herein as a "process". When a program is executed, the operating system typically creates a new process for each instance of the program being executed. The process is like an envelope for the program which identifies the program with a process number (e.g., a process identifier or "ID") and associates other bookkeeping information to the process. Many operating systems, including UNIX and Windows, can run many processes (or tasks) at the same time and are called multi-tasking operating systems.

The invention claimed is:

1. A data tracking system comprising:
a plurality of hosts distributed across a plurality of data center hosting facilities, each host including one or more agents of a plurality of agents to capture and record system events at the plurality of hosts, the system events resulting from a plurality of component processes executing at the plurality of hosts;
one or more processors;
one or more storage media storing instructions which, when executed by the one or more processors, cause:
determining that a set of captured and recorded system events from the plurality of agents pertain to a distributed component distributed across the plurality of hosts;
reconstructing, from the set of captured and recorded system events that pertain to the distributed component, metric data reflecting quantity of computing resources used by the plurality of component processes executing at the plurality of hosts; and
causing display of the metric data to a user in a graphical user interface.

2. The system of claim 1, wherein the set of captured and recorded system events include system events executed in response to one or more distributed transactions that pertain to the distributed component.

3. The system of claim 1, wherein the computing resources used by the plurality of component processes include at least one of network data and file exchange, creation or removal of processes, library loading, or user impersonation.

4. The system of claim 1, wherein the one or more storage media storing instructions which, when executed by the one or more processors, further cause:
sorting, in a chronological order, the set of captured and recorded system events.

5. The system of claim 1, wherein the plurality of agents is configured to capture system events from operating systems on the plurality of hosts by intercepting system calls to the operating systems from the plurality of component processes.

6. The system of claim 1, wherein each host of the plurality of hosts is a computing device or a virtual machine instance.

7. The system of claim 1, wherein the distributed component includes a request corresponding to when a HyperText Transfer Protocol (HTTP) or a Secure HyperText Transfer Protocol (HTTPS) request is received at a web server host of the plurality of hosts and when the web server host completes sending of a HTTP or HTTPS response to the HTTP or HTTPS request.

8. The system of claim 1, wherein the distributed component includes a request corresponding to when a database query request is received at a database server host of the plurality of hosts and when the database server host completes sending of a database query response to the database query request.

9. The system of claim 1, wherein the graphical user interface is a web page.

10. The system of claim 1, wherein each of the plurality of component processes execute functionality of one of a plurality of components; and wherein the metric data caused to be displayed the graphical user interface indicates, for each of the plurality of components, a quantity of a particular computing resource used by the component to process requests from the distributed component.

11. The system of claim 10, wherein each component of the plurality of components is one of a web server, an application server, and a database server.

12. The system of claim 1, wherein the metric data caused to be displayed in the graphical user interface indicates time spent by the plurality of component processes using the computing resources to process requests from the distributed component.

13. The system of claim 1, wherein the plurality of agents is configured to associate additional contextual information with a captured system event by querying one or more system state tables and/or querying an operating system interface using information from the captured system event.

14. A method comprising:
  determining that a set of captured and recorded system events from a plurality of agents pertain to a distributed component distributed across a plurality of hosts, the plurality of hosts distributed across a plurality of data center hosting facilities, each host including one or more agents of the plurality of agents to capture and record system events at the plurality of hosts, the system events resulting from a plurality of component processes executing at the plurality of hosts;
  reconstructing, from the set of captured and recorded system events that pertain to the distributed component, metric data reflecting quantity of computing resources used by the plurality of component processes executing at the plurality of hosts;
  causing display of the metric data to a user in a graphical user interface; and
  wherein the method is performed by a computing system having one or more processors and storage media, the storage media storing one or more programs having instructions configured to perform the method.

15. The method of claim 14, wherein the set of captured and recorded system events include system events executed in response to one or more distributed transactions that pertain to the distributed component.

16. The method of claim 14, wherein the computing resources used by the plurality of component processes include at least one of network data and file exchange, creation or removal of processes, library loading, or user impersonation.

17. The method of claim 14, further comprising:
  sorting, in a chronological order, the set of captured and recorded system events.

18. One or more non-transitory computer-readable media storing one or more programs having instructions for execution by a computing system having one or more processors, the instructions configured for:
  determining that a set of captured and recorded system events from a plurality of agents pertain to a distributed component distributed across a plurality of hosts, the plurality of hosts distributed across a plurality of data center hosting facilities, each host including one or more agents of the plurality of agents to capture and record system events at the plurality of hosts, the system events resulting from a plurality of component processes executing at the plurality of hosts;
  reconstructing, from the set of captured and recorded system events that pertain to the distributed component, metric data reflecting quantity of computing resources used by the plurality of component processes executing at the plurality of hosts; and
  causing display of the metric data to a user in a graphical user interface.

19. The one or more non-transitory computer-readable media of claim 18, wherein the set of captured and recorded system events include system events executed in response to one or more distributed transactions that pertain to the distributed component.

20. The one or more non-transitory computer-readable media of claim 18, wherein the computing resources used by the plurality of component processes include at least one of network data and file exchange, creation or removal of processes, library loading, or user impersonation.

* * * * *

UNITED STATES PATENT AND TRADEMARK OFFICE
CERTIFICATE OF CORRECTION

PATENT NO. : 10,181,981 B2
APPLICATION NO. : 15/905455
DATED : January 15, 2019
INVENTOR(S) : Loris Degioanni Page 1 of 1

It is certified that error appears in the above-identified patent and that said Letters Patent is hereby corrected as shown below:

In the Claims

Column 28, Claim 20: Line 35: Delete "The one of more" and insert --The one or more--.

Signed and Sealed this
Twenty-sixth Day of February, 2019

Andrei Iancu
*Director of the United States Patent and Trademark Office*